Inventor
Walter B. Herndon
By Willits, Helwig & Caillo
Attorneys

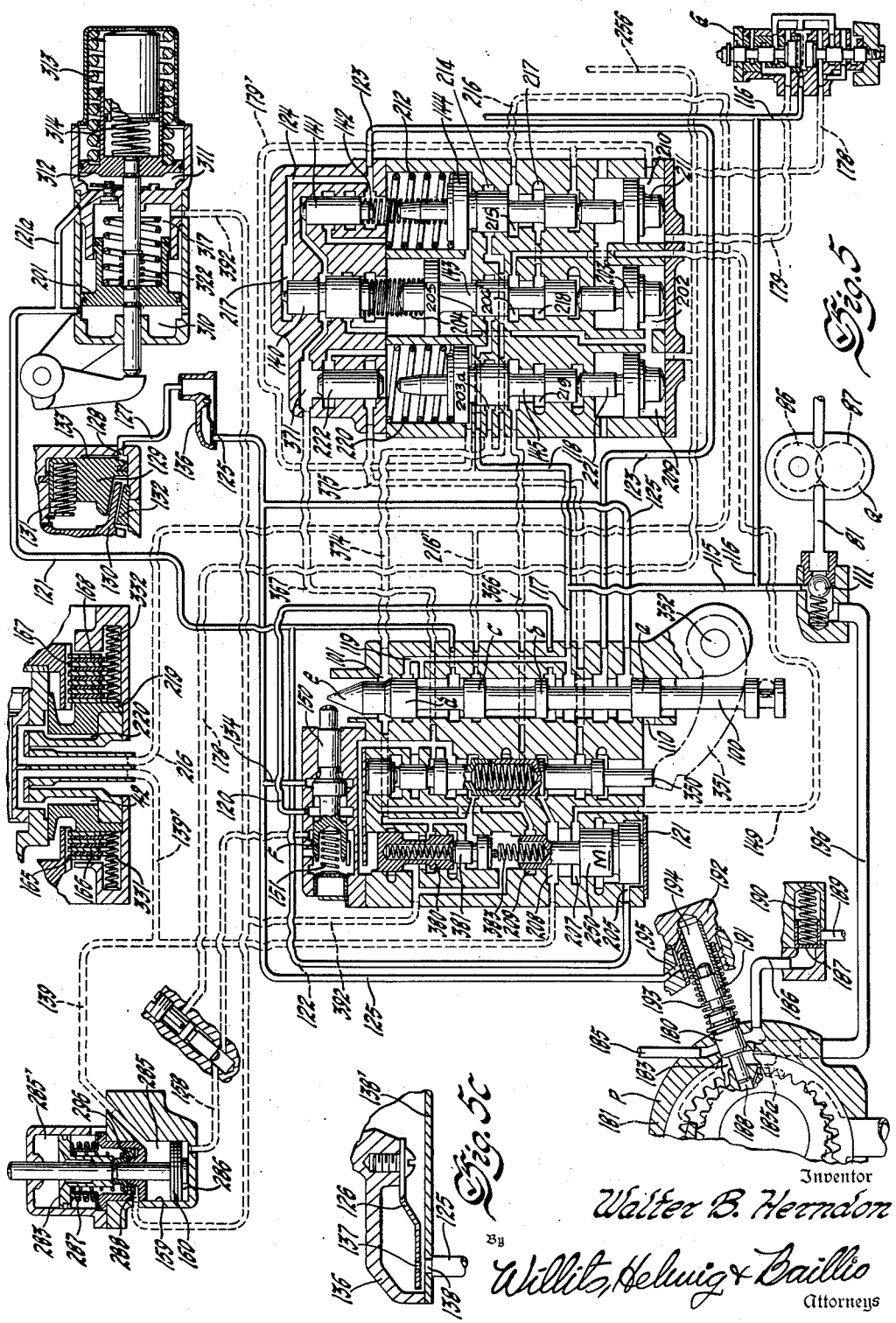

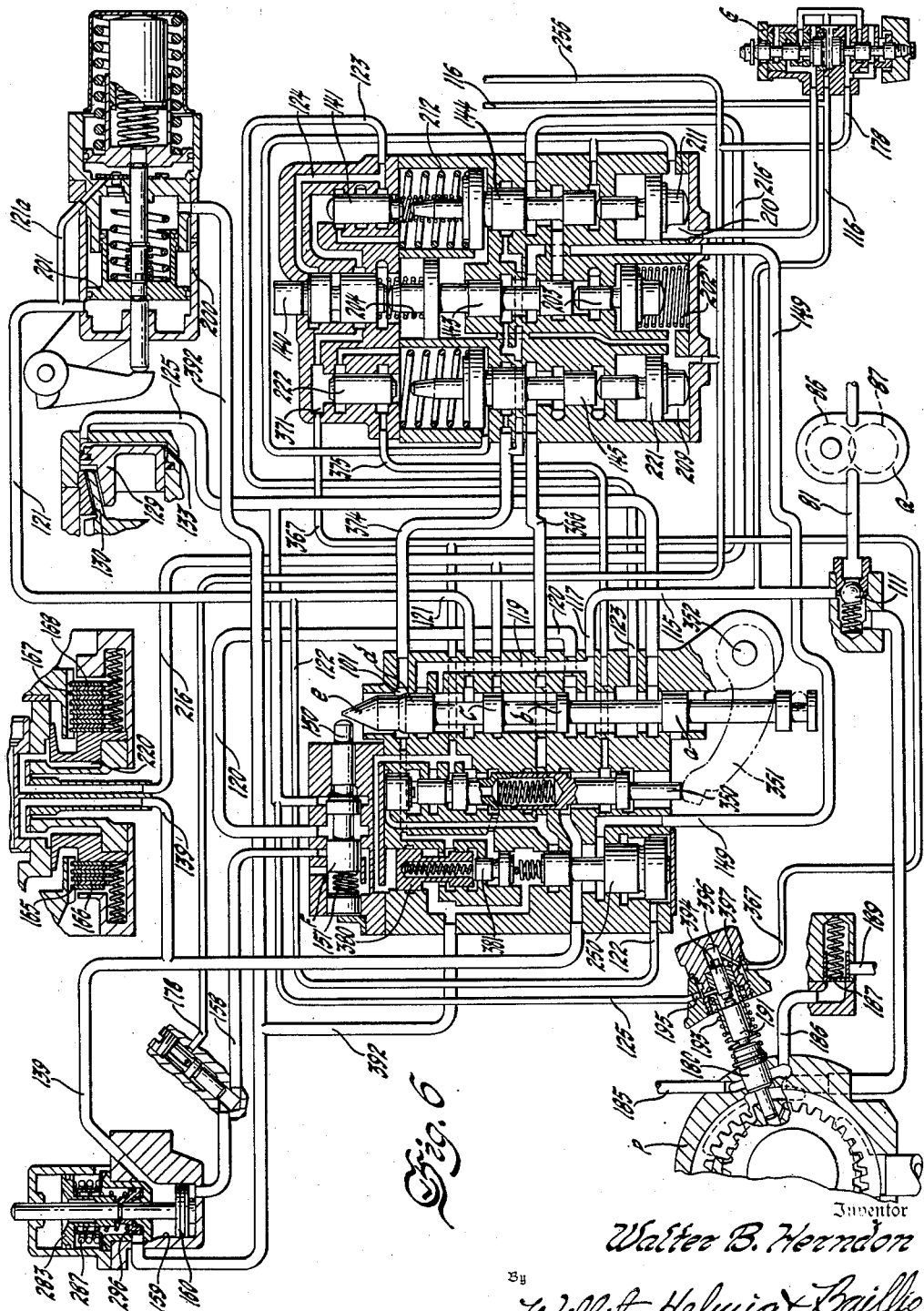

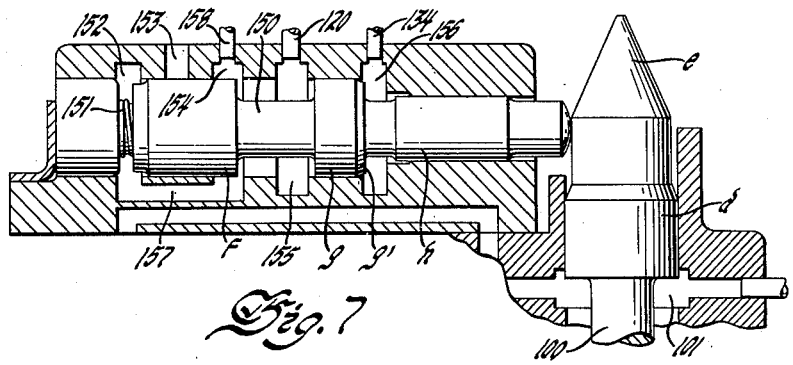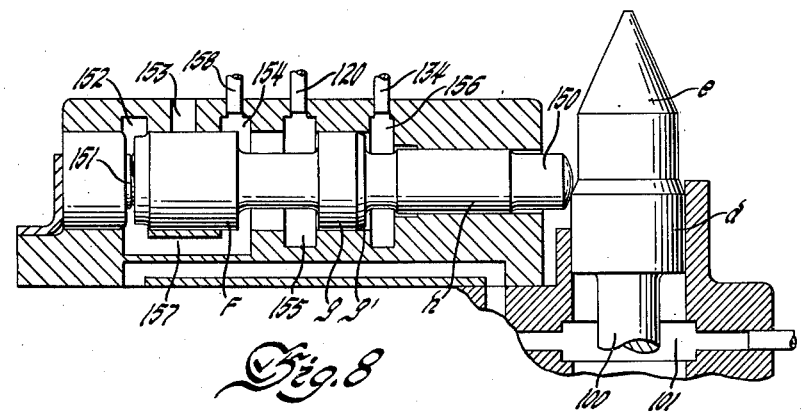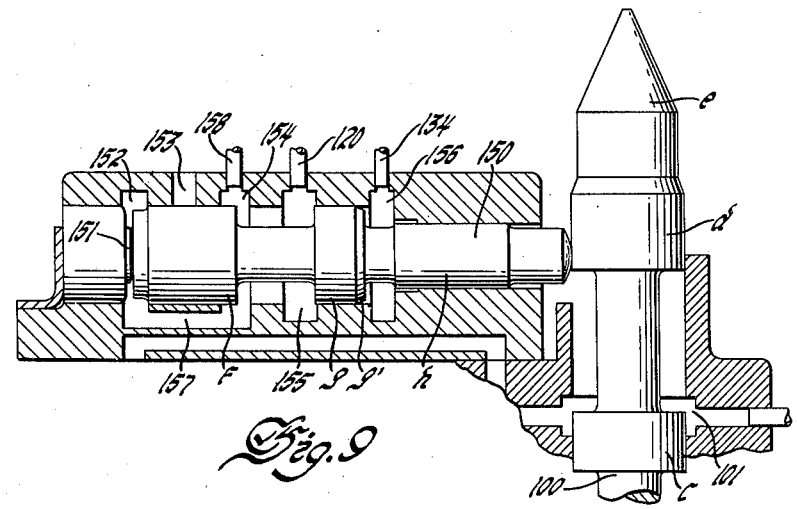

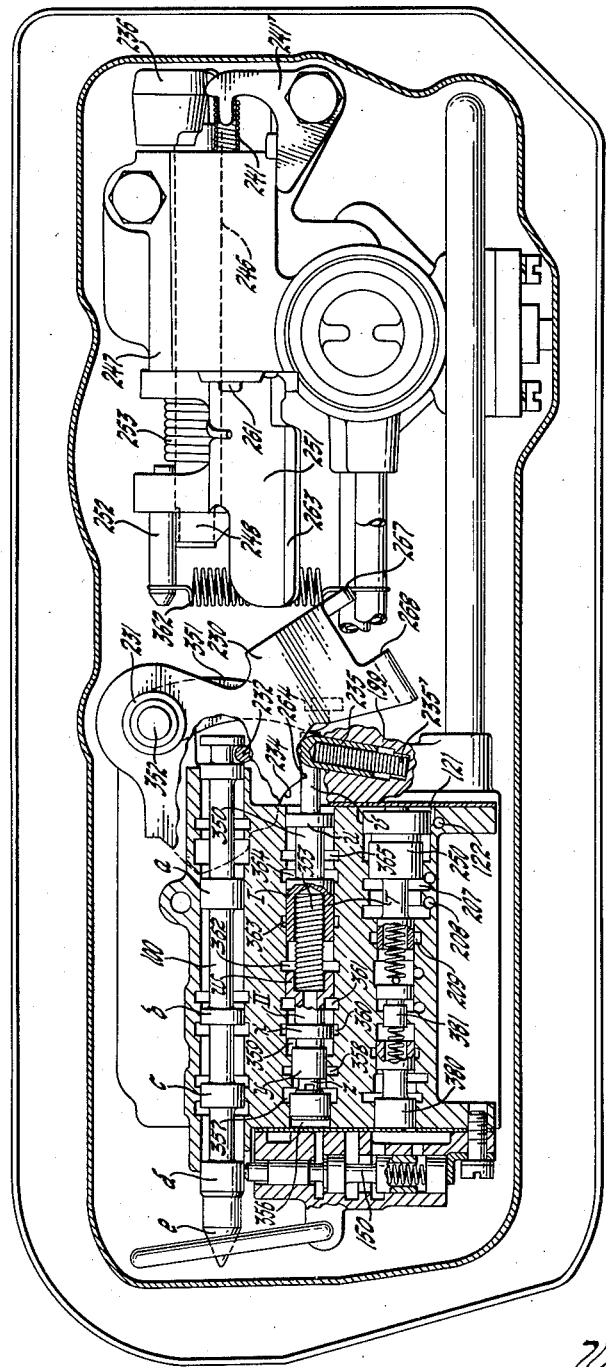

Inventor
Walter B. Herndon
By Willits, Helmig & Baillio
Attorneys

United States Patent Office 2,763,162
Patented Sept. 18, 1956

2,763,162

TRANSMISSION AND FLUID PRESSURE CONTROLS

Walter B. Herndon, Rochester, Mich., assignor to General Motors Corporation, Detroit, Mich., a corporation of Delaware Application December 8, 1950, Serial No. 199,806

23 Claims. (Cl. 74—645)

The present invention relates to automatic transmissions, particularly for vehicles, and more particularly to those transmissions having friction, torque-sustaining members actuated by controlled fluid pressure supplied by pumps driven by the power and load shafting; in which the speed ratio ranges are selected by fluid pressure operated valving moved to various positions in accordance with variations in vehicle speed and in the torque demand applied by the driver or operator to the engine power control.

The invention pertains further to transmission drive structures embodying plural step-ratio change mechanism, wherein plural paths of torque are established through separate torque-multiplying channels and their torques recombined in a novel gearing arrangement having unique means to obtain reverse drive.

It pertains in particular to a compound reverse gear arrangement wherein novel means are utilized to establish reverse torque, and in which the torque reaction force is applied to assist in the energizing of the friction member which sustains that force, and especial advantages obtain from the arrangement of the reverse gear elements and their torque-reaction supporting structures as will be understood further in detail in this specification.

Among the manifold advantages and special features of the invention disclosed herein are drive control structures which are commonly controlled with the transmission ratio controls, and which are made effective to brake the motion of the vehicle under given drive circumstances, controlled in part by the drive conditions, so as to provide a degree of safety of operation superior to that obtainable in related braking controls now in general use.

A further useful feature is the provision herein of a fluid pressure ratio control system for the drive of the transmission which is effective when set for reverse drive to cause one of two friction torque-sustaining members to be first applied by the fluid pressure, prior to the fluid pressure application of the other of the said two members, the sequence of this application being controlled in part by the rise of pressure in the application of the first said member, and in part by pressure-responsive devices which provide a timing control to the application of fluid pressure to the second of said members.

Another feature of novelty consists in the provision of a transmission control system including a parking brake mechanism having means for preloading the mechanism for actuation when the driver operable control valve is positioned for reverse condition of transmission operation, and including means responsive to system pressure for blocking the actuation of the parking brake mechanism whenever the system pressure exceeds a predetermined pressure.

Additional features of novelty are disclosed herein, consisting of a fluid pressure ratio control and actuation system having valving automatically moved by fluid pressure for various required operations of selecting the actuation of a plurality of friction, torque-sustaining members, and of graduating the action of said members; having manual valving operative to select initial forward or reverse drive, and having hydraulic interlock passages connected to withhold or set aside the automatic responses of certain of said automatically-moved valving and prevent such responses, while operating to permit the operation of certain others of said automatic fluid-pressure responsive valving such as the aforesaid timing devices.

The above-recited features of novelty appear herein, for the most part, in singular embodiments rather than in various modifications, it being understood that these features may be demonstrated by other structural forms without departing from the teachings of the invention.

A further feature of novelty consists in the provision of a pump and circulatory system whereby working fluid is directed first to a fluid flywheel structure and then to a step-ratio transmission mechanism for lubricating the latter, whereby oil heated in the fluid flywheel structure is cooled by two separate heat-flow surfaces.

These and other novel features and objects of this invention will be apparent from the following specification and claims taken in conjunction with the accompanying drawings, in which:

Figure 5 is a schematic control diagram of one form of fluid pressure actuation and control system, wherein the friction torque-sustaining members and their actuators of the preceding figures are shown at the top of the drawing, the ratio control valving in the center, and the pump supply portion of the system, and the hydraulic governor at the bottom.

Figure 5c is an enlarged view of the check valve 136 of Figure 5, illustrating the fluid flow restricting ports of the valve and valve body.

Figure 6 is a similar control diagram to that of Figure 5, wherein some modification features appear, such as the use of throttle-pedal-modulated line pressure and second speed automatic start, in combination with the special control features demonstrated in Figure 5.

Figures 7, 8 and 9 are part sections of the timing valve construction of Figures 5 and 6, used to stage the sequence of fluid pressure servo actuation of the friction members which sustain the reverse drive torque. The manual selector valve is shown in three successive positions, moved upward from the reverse control position of Figures 5 and 6, to show the relative displacements of the timing valve bosses and ports.

Figure 9 shows the timing valve in its full non-operating station, held out of action by the manual valve.

Figure 1:
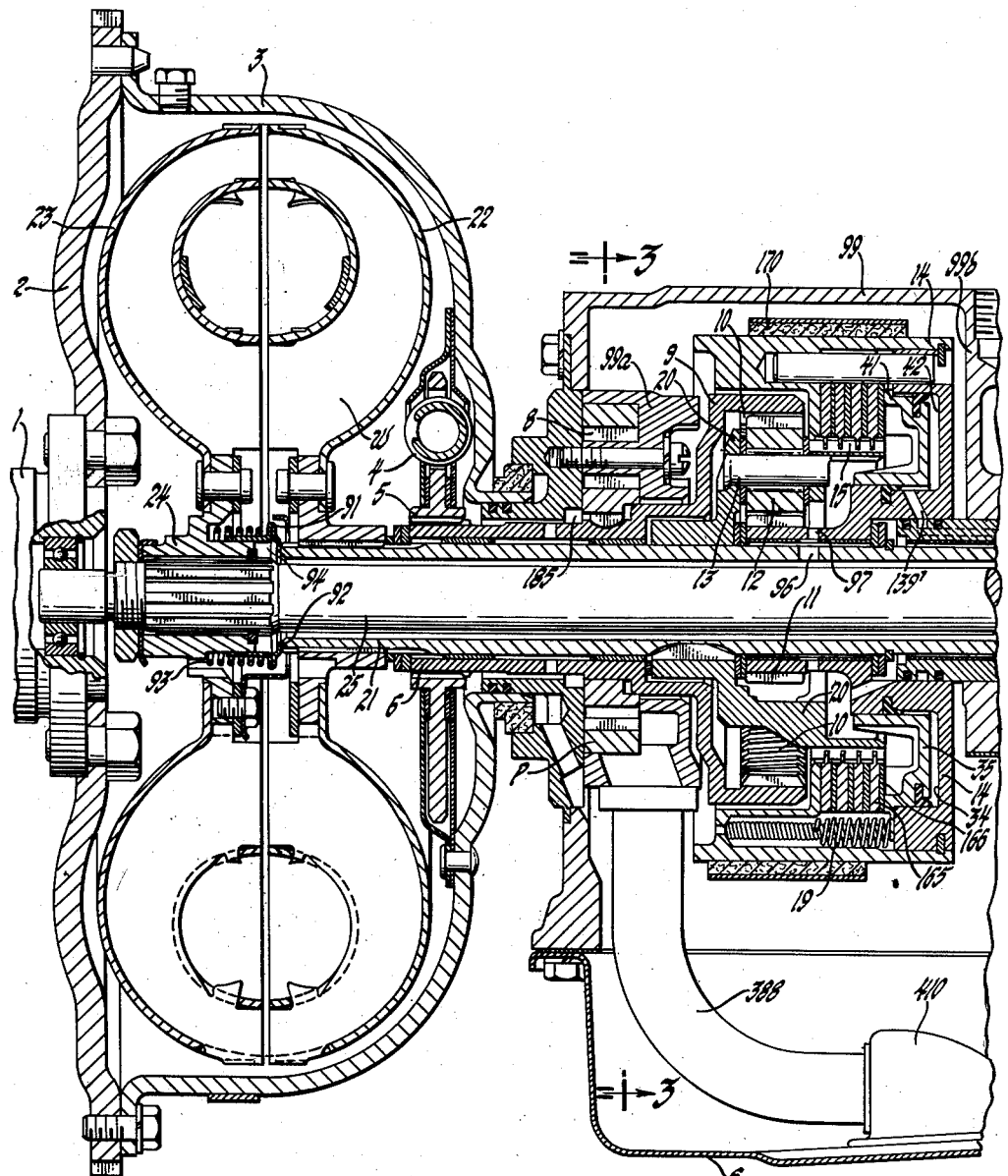
Figures 1 and 2 are adjoined vertical sections of the transmission drive mechanism of the invention, to the same dimensional scale.
Figure 2:
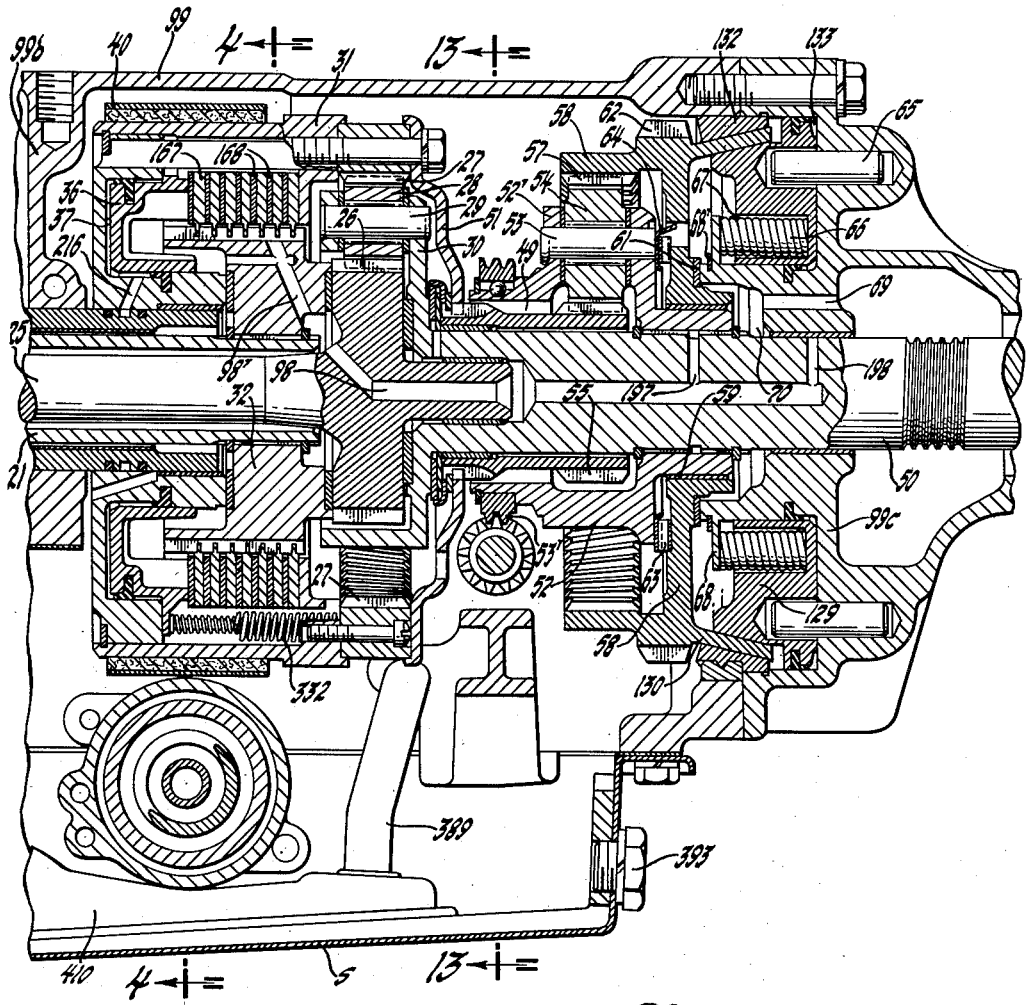

Figure 10 is a side view of the transmission casing of Figures 1 and 2 with the valving of Figures 5 and 6 shown in part, with the valve housing sectioned; with the mechanical external operator controls aligned for the required shift operations; and shows the coordinated braking mechanism as it appears with the cover-plate removed.

Figure 11:
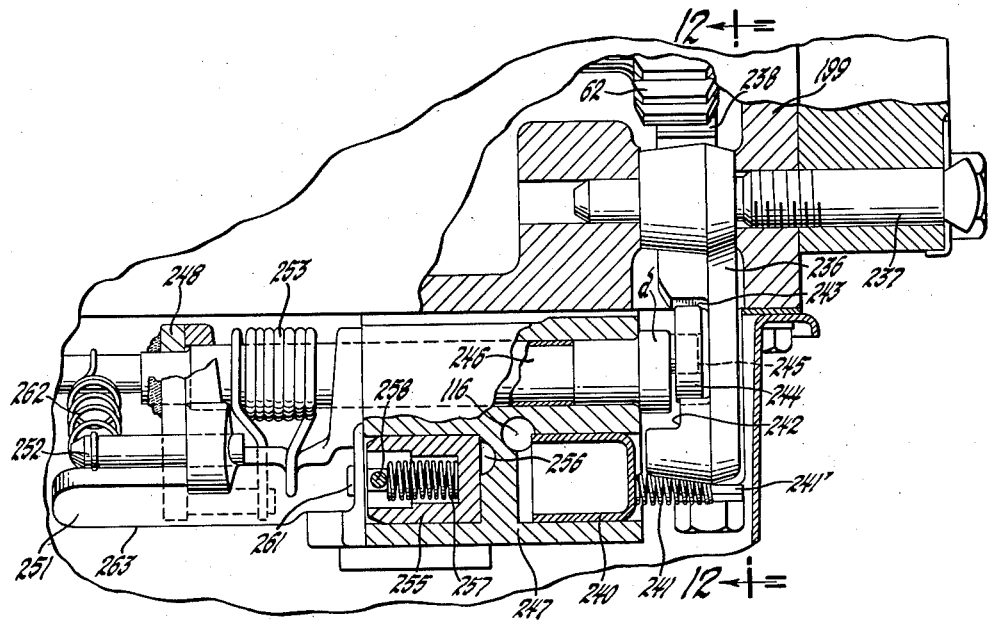
Figure 12:
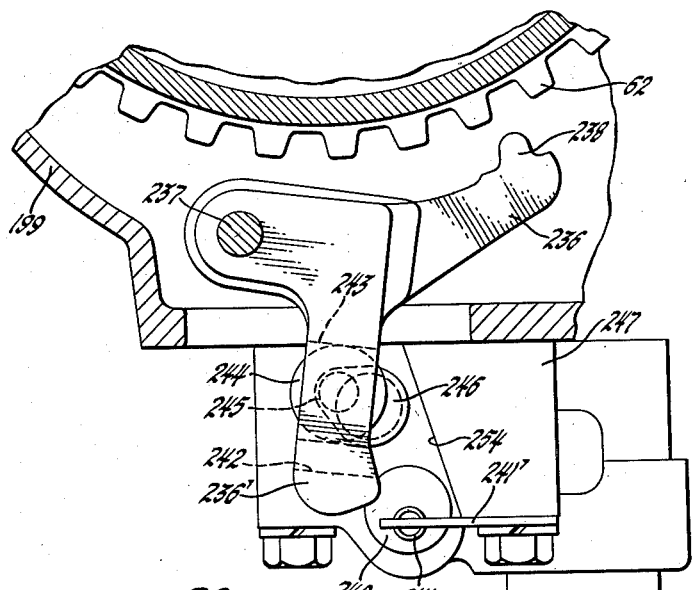

Figures 11 and 12 show the details of the braking mechanism controlled by the external control mechanism of Figure 10, the part section elevation view of Figure 11 being in a parallel plane to the right hand portion of Figure 10, and the Figure 12 view being taken at 12—12 of Figure 11, at right angles to the Figures 10 and 11 views.

Figure 13:
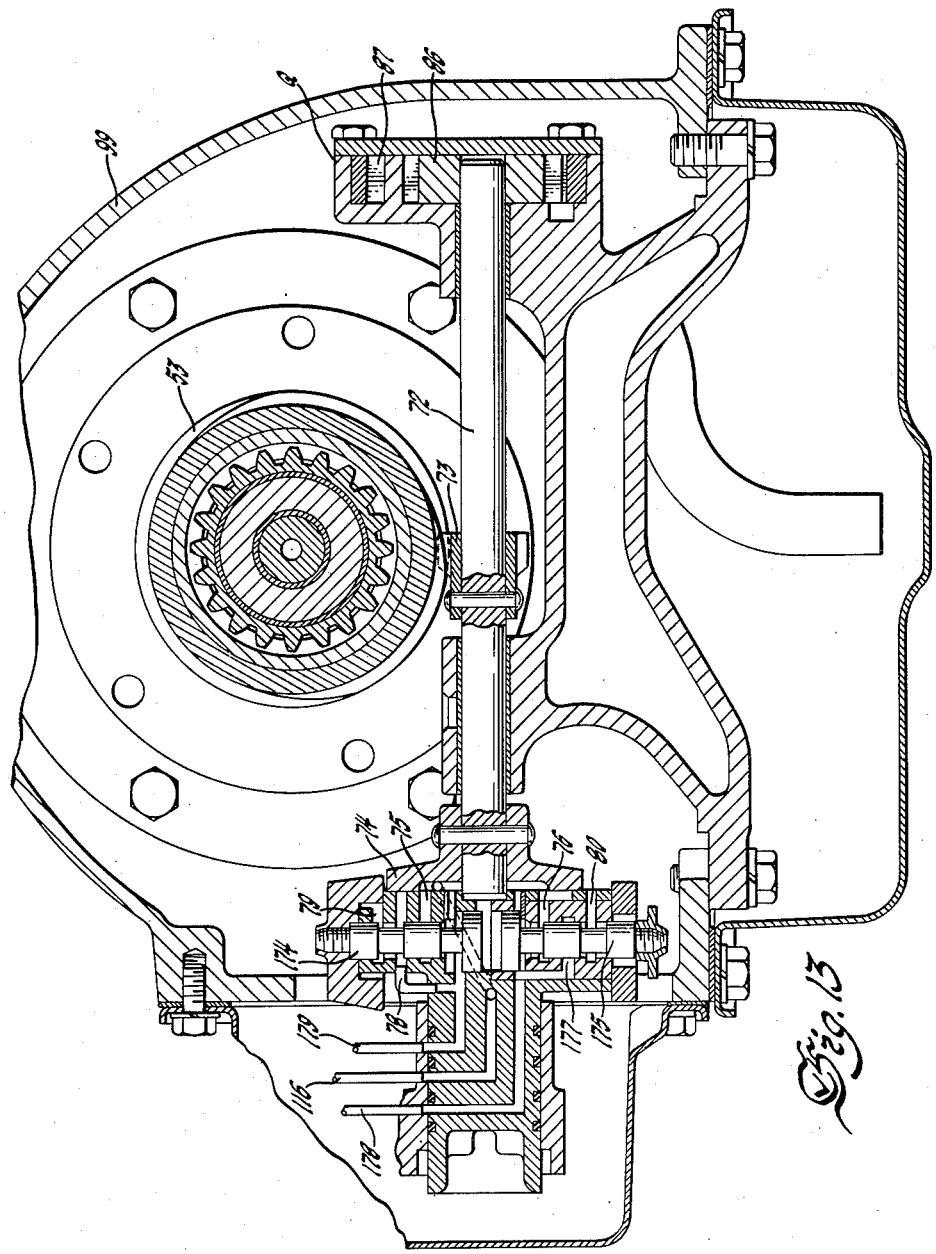

Figure 13 is a cross-sectional view of the governor and its drive mechanism, the cross shaft drive appearing in Figure 2.

Figure 14:
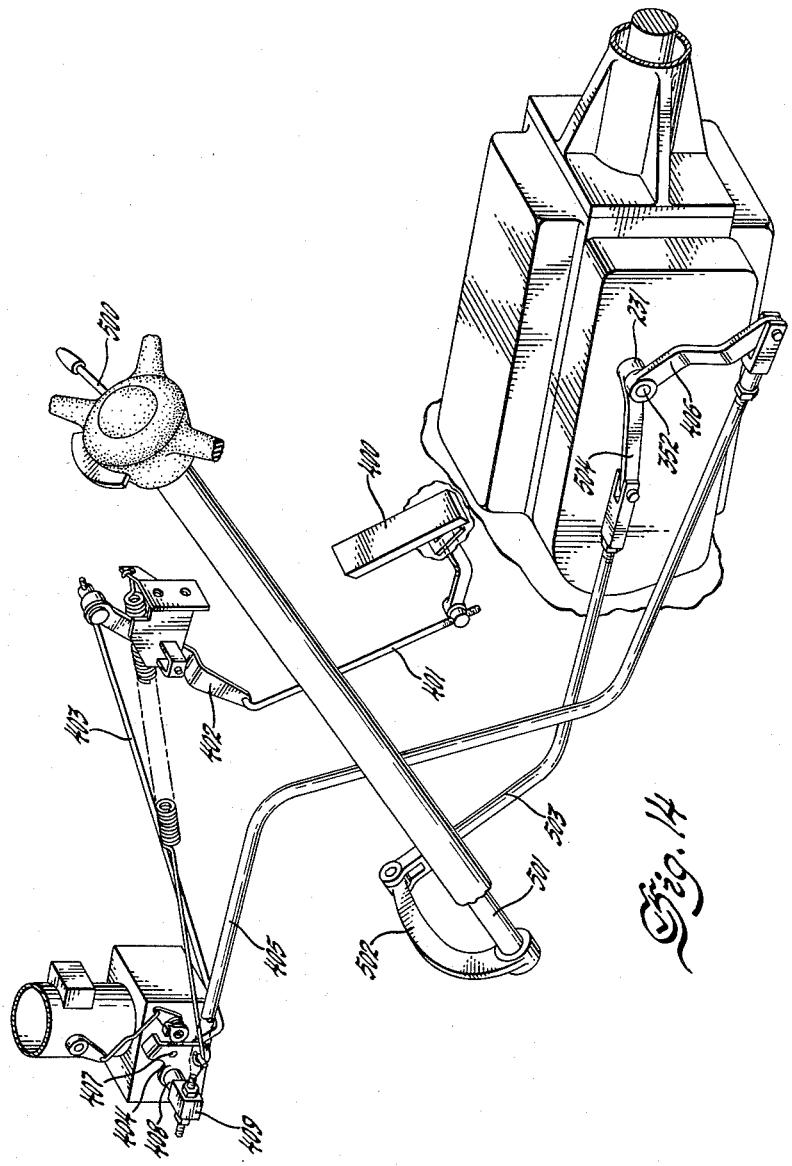

Figure 14 is a view of the driver's control mechanism for controlling the structures of Figure 10.

Figure 15:
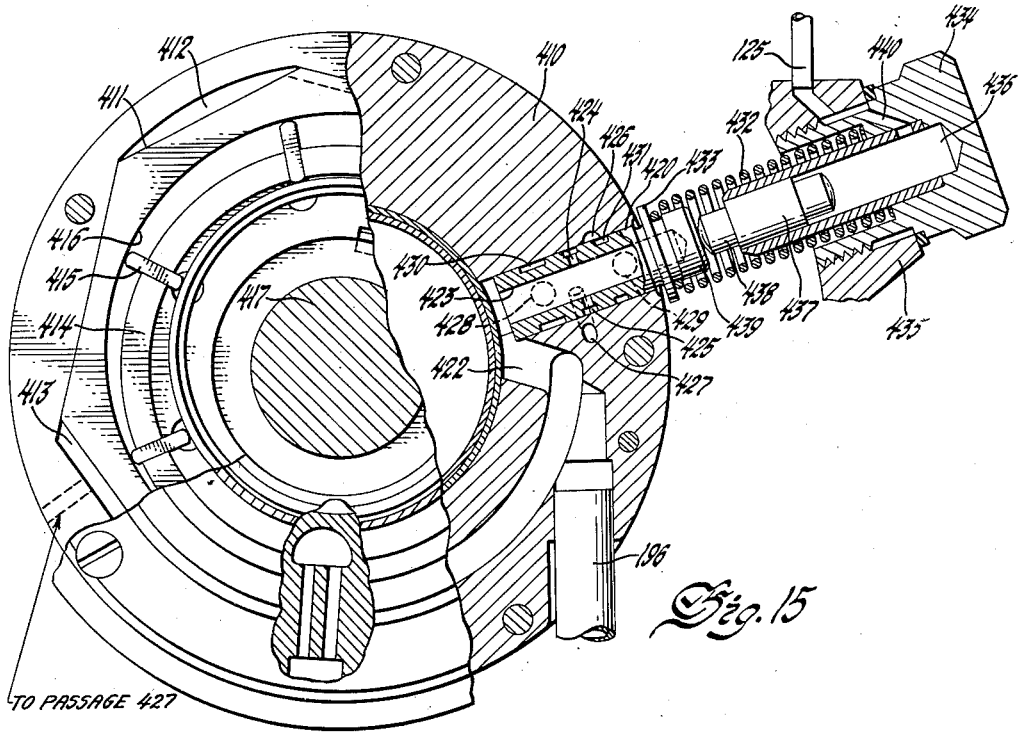

Figure 15 is a partially sectional view of a variable capacity pump and control therefore which may be substituted for the gear pump and pump control of Figure 5.

Figure 16:
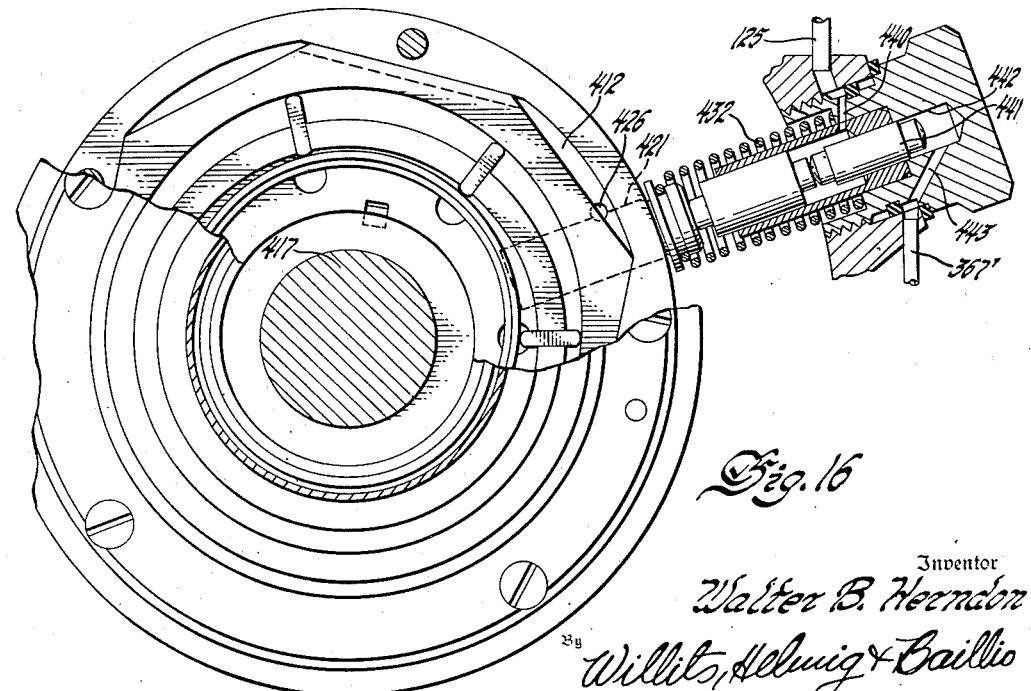

Figure 16 is a partially sectional view of the same variable capacity pump illustrated in Figure 15 and illustrating a modified pump control arrangement which may be utilized in place of the pump and pump control illustrated in Figure 6.

The drive structure of the transmission of the invention is shown in section in companion Figures 1 and 2. The engine shaft 1 is bolted to flywheel plate 2 fastened to drum 3 connected by vibration damper device 4 to hub 5 splined to hollow shaft 6, which is keyed to drive pump gear 7 (see Figure 3) of pump P, and formed at the right into drum 9 having internal gear teeth 10 meshing with planet gears 12 meshed with sun gear 11. The planets 12 are supported on spindles 13 of carrier 20 connected to shaft 21, the right hand portion 15 connected to the carrier being formed to accommodate clutch plates 165, mating with plates 166 rotating with drum 14 connected to sun gear 11. This gear group is referred to as the front unit, and is made operative by application of band 170 to drum 14 of sun gear 11, or by engagement of the clutch 165—166.

The right hand inner wall of drum 14 is recessed to form an annular cylinder space 42 for clutch piston 41, fed by fluid pressure in passage 139'.

The forward extension of hollow shaft 21 is splined to the hub of fluid flywheel rotor or impeller 22 facing rotor 23 to form a fluid turbine working space W. The hub 24 of rotor 23 is splined to the forward end of transmission shaft 25. The clutch 165—166 is disengaged by springs 19 supported in the left wall of drum 14.

The pump P is built into the forward web of the transmission housing 99, and consists of drive gear 7 meshing with idler gear 8 supported in section 99a. It draws oil from sump S through passage 388 and delivers fluid under pressure to maintain the fluid working space W filled, to furnish pressure lubrication to the system, and to supply the requirements of the transmission servo systems shown in Figures 5 and 6.

The casing web 99b divides the transmission radially, and supports the shafting as shown, while affording passage space for the fluid servo and lubrication feed connections.

In Figure 2 the gear group 26, 27, 28 is considered the rear unit, and shaft 25 is integral with sun gear 26 meshed with planet gears 28 supported on spindles 29 of carrier 30 integral with output or load shaft 50. Internal gear 27 meshes with planets 28 and is attached to drum 31 which is equipped with key bolts for clutch plates 167 mating with plates 168 keyed to drum 32 splined on the rearwardly extending portion of shaft 21.

The forward wall of drum 31 is recessed to form an annular cylinder space 37 for piston 36, and springs 332 serve to disengage plates 166 and 167 when cylinder 37 is connected to exhaust.

The rear unit is operated to change the speed ratio by alternate application of band 40 to the drum 31 of annulus gear 27, or by engagement of clutch 166—167. The clutch engaging and holding fluid pressure is delivered by passage 216 to cylinder 37.

The gear unit at the extreme right of Figure 2 is for providing reverse rotation of shaft 50. A plate 51 is splined to the forward portion of sleeve 49 of sun gear 55 which gear 55 meshes with planet gears 54 supported on spindles 53 of carrier 52 splined to shaft 50.

The output drive mechanism at the right of Figure 2 consists of a driven shaft 50, the forward end of which is flanged to form the carrier 30 for the rear unit.

Reverse unit carrier 52 is splined to shaft 50, and has affixed planet spindles 53, and the forward half 52' of carrier 52 is fixed to speedometer and governor drive gear 53'. The planet gears 54 on spindles 53 mesh with the sun gear 55, the extension 49 of which is splined to plate 51, and planets 54 also mesh with annulus gear 57 of drum 58 supported for axial movement on bearing sleeve 59, and for abutment against thrust washer 61.

Parking brake teeth 62 are cut on the periphery of the drum 58, and the drum carries a brake cone 130 at the right, operable to be braked by piston 129 forcing it against backing cone 132 keyed to the housing 99.

The brake cone 130 is engaged when the manual selector 500 of Figure 14 is placed for "reverse," and a pawl member 236 carries teeth 238 (see Figures 11 and 12) adapted to engage teeth 62 when the manual selector 500 is placed in reverse and the vehicle is standing still with the engine turned off as hereafter more particularly explained. When teeth 238 of pawl 236 engage teeth 62, the drum 58 is locked against rotation, this action providing a parking brake for the vehicle.

The wave-washer spring 63 seats against thrust washer 64 supported on carrier 52 and against the radial web of drum 58.

The teeth of the sun gear 55, planets 54 and annulus gear 57 are cut helically, for running quietly, and for providing a torque thrust operable to apply a self-energized brake action to cone 130, when there is initial braking force applied by piston 129.

Assuming that the teeth of annulus gear 57 and planet gears 54 are cut with a right-hand helix angle, and that the effect of delivered torque to drum 31 and sun gear 55 applies rotation to the sun gear 55, for reverse drive of output carrier 52, the annulus gear 57 in attempting to rotate forwardly, meets the resistance of friction on the cone surfaces of cone 130 and elements 129 and 132. Because of the resultant thrust of the helix angle between the teeth of planet gears 54 and annulus gear 57, the annulus gear 57 receives a thrust to the left toward the forward end of the transmission and this trust is applied to cone 130 as a braking effort adding to the thrust applied by piston 129. This action compresses the wavy spring 63.

The design helix angle for these gears may be taken according to engineering standards, but it is preferred in the present disclosure to have the self-energizing brake force, lie between 18 and 30 per cent of the total cone braking force.

When the vehicle is decelerated during reverse drive, the self-energizing action is obviously reversed, and the annulus gear 57 endeavors to move to the right assisted by spring 63 into abutment with washer 61, while the piston 129 retains the fluid pressure actuation force on cone 130.

It will be seen that upon deceleration, such as occurs when the driver relaxes the engine accelerator and may apply the vehicle brakes, the device is ready to apply a reverse brake release force to the cone 130, the instant the fluid pressure which is holding the piston 129 applied, is released or exhausted.

This arrangement prevents slamming of the torque-sustaining elements, prevents sudden build-up of torque surges, and contributes to smoothness of operation, particularly noticeable when rocking a car in low forward, or reverse, out of a soft traction spot.

The cooperative action of the control system of Figures 5 and 6 is, of course, involved in this overall smooth drive, transition effect, discussed in this specification separately.

The annular piston 129 is recessed in the cylinder space 133 of the casing 99, guided on pins 65 and held against rotation forces.

Brake release springs 66 are recessed in pockets 67 of piston 129 and are retained by annulus disc 68 held against leftward motion by lock ring 68′.

Axial holes 69 in the web 99c of casing 99 drain oil from space 70 back to the main transmission sump S. Oil pressure is supplied to cylinder space 133 behind piston 129 by means of a passage 127 (see Figure 5), as will hereafter be more fully explained.

Figure 3:
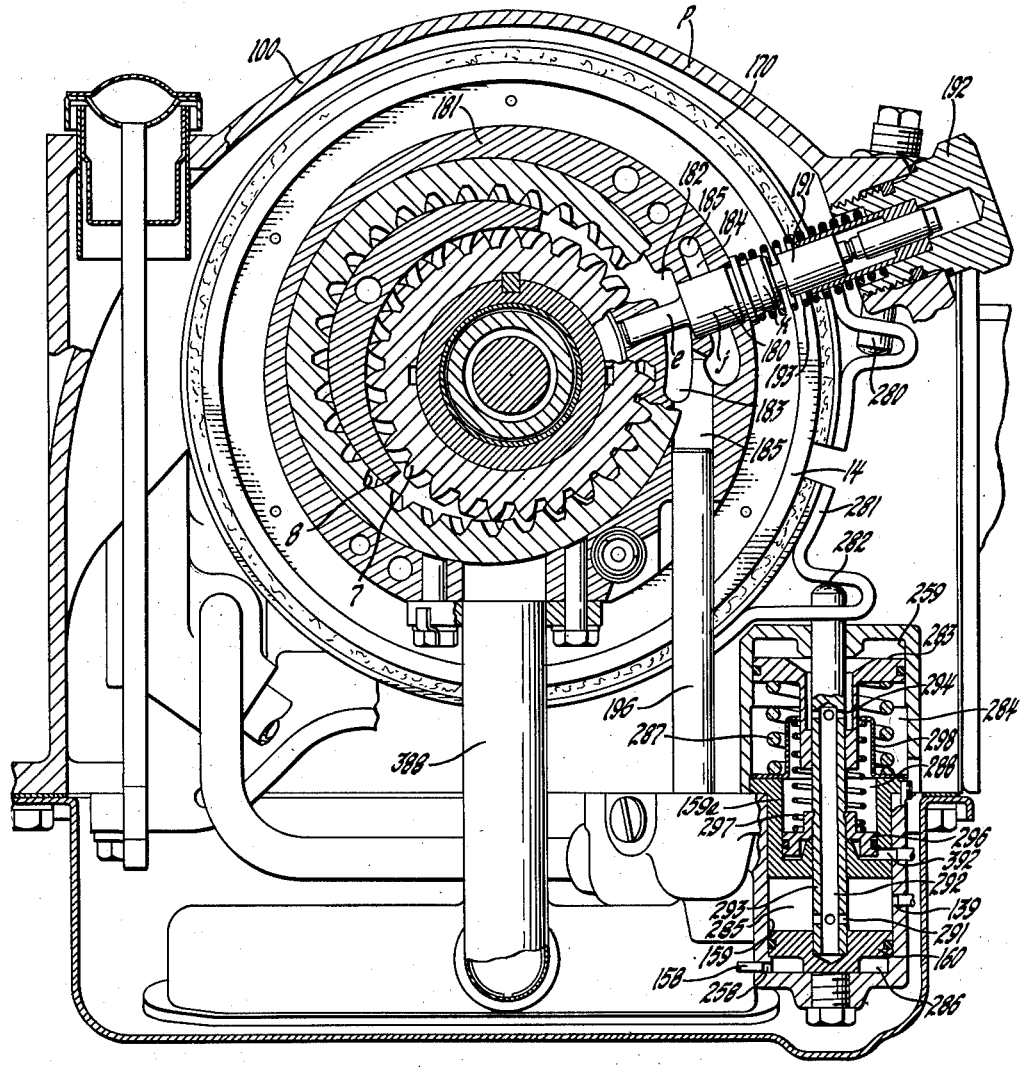
Figure 3 is a cross-section of the transmission taken at 3—3 of Figure 1, to show one of the servo pumps and the line pressure regulator valving, and to show the fluid pressure servo actuator device for the front unit reaction brake.

In Figure 3 the band 170 is self-sprung to clear the drum 14, and is supported in casing 99 by adjustable anchor 280, and actuated at the movable end 281 by rod 282 fixed to piston 160, sliding in the cylinder 159. The central web member 159a of cylinder 159 separates space 284 from space 285. Piston 160 moves upward under influence of fluid pressure fed to space 286 through passage 158.

Under "neutral" control, there is no servo pressure applied to the front unit cylinder space 286 and spring 287 acting through member 298 bearing upon web member 159a secured to stem 293 forces stem 293 and piston 160 downwardly to yieldably bias the piston 160 in brake-releasing position. Under either forward or reverse setting of manual valve 100 of Figures 5 and 5a, line pressure from pump line 115 is delivered via ports 106 and 107 to line 120 and to line 158 acting upward upon piston 160, to apply band 170.

Figure 5A:
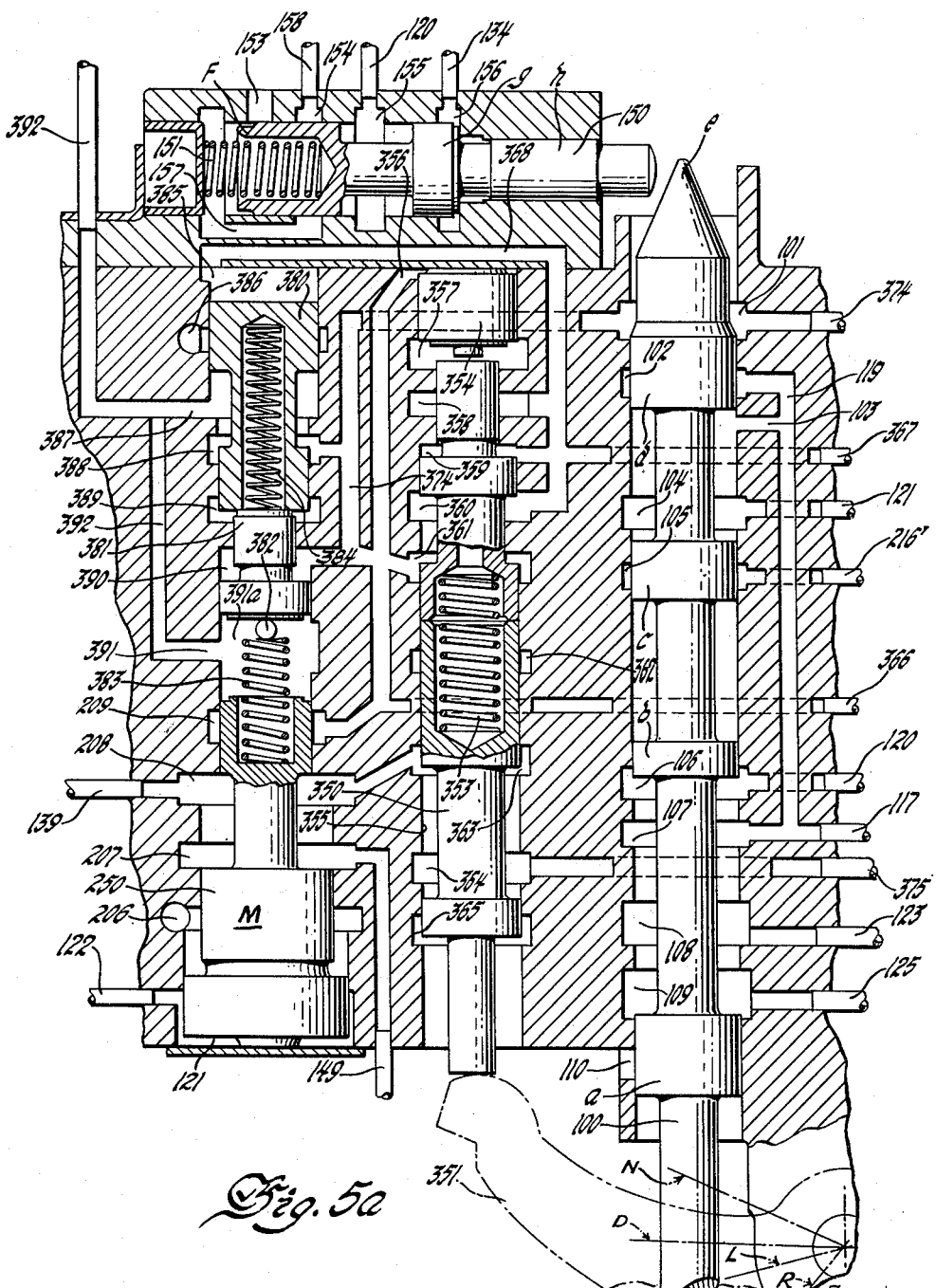
Figure 5a is an enlarged view of the control valving shown at the left hand side of Figure 5, to more clearly illustrate the valve details.

Compensator pressure, derived from pressure varied and controlled by the accelerator pedal 400 through the compensator valve 380 of Figures 5 and 5a, is fed via passage 392 to space 288 to augment the pressure below piston 160, which compensator pressure varies with throttle advance, so that the band 170 is variably loaded to maximum under heavy torque demand as explained hereafter.

Brake releasing pressure is fed from line 139 to space 285 to counteract that of line 158 acting on the underside of piston 160, and passes through ports 291 to the passage 292 in hollow stem 293, and out through ports 294 to apply a thrust on the upper face of piston 283 (see Figure 3). Piston 296 fixed to rod 282 is held downward in space 288 by spring 297 retained by piece 298. The combined effective areas of pistons 160 and 283 is greater than that of pistons 296 and 160, hence the pressure in line 139 acts to release band 170.

Figure 4:
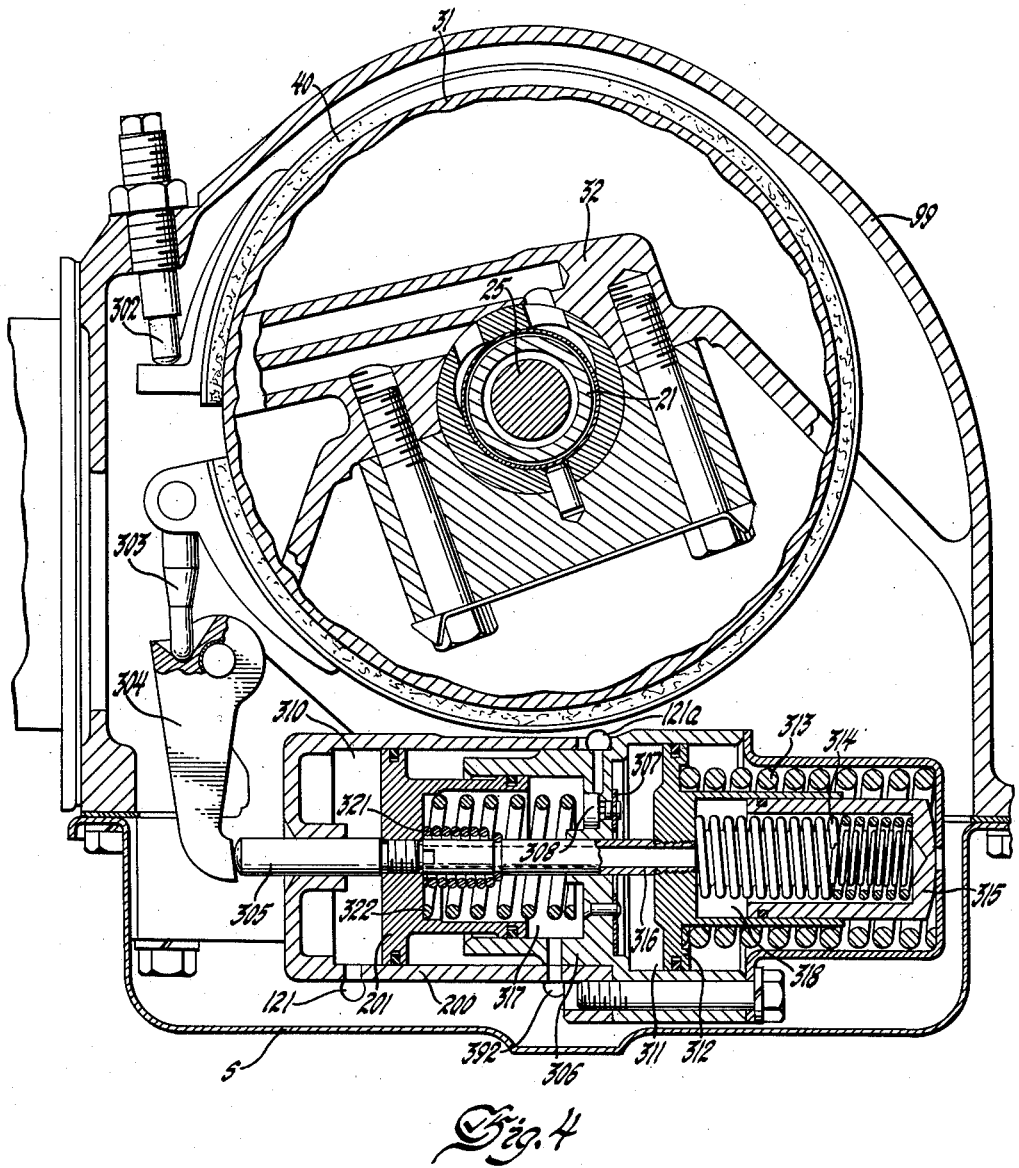
Figure 4 is a similar cross-section taken at 4—4 of Figure 2 to show the fluid pressure servo actuator device for the rear unit reaction brake.

In Figure 4 the rear unit brake band 40 is self-sprung to normally be released from drum 31 to prevent drag of the band on drum 31 when fluid pressure is admitted to the band operating servo for band release actuation, and is held by adjustable anchor 302, and movable strut 303, loaded by rocker 304 is moved clockwise by the thrust of piston rod 305, of piston 201. The piston 201 is of two-step form. The central web 306 of the cylinder 200 is equipped with a check valve 307 of blade type, operable by plunger 308.

The main line pressure for releasing the normally applied rear unit band is furnished by line 121 to space 310, and by line 121a to the left of the check valve 307 to enter space 311 so as to apply a rightward thrust to piston 312. The latter is loaded by brake-applying springs 313. The skirt of the piston 312 at the right, slides outside of spring retainer cap 315, the springs 314 bearing against the rear face of piston 312. A tubular portion 316 of piston 312 extends to the left as a thrust spacer element, bearing against piston 201. Buffer spring 321 prevents slamming of 316 against piston 201. Spring 322 is fastened to travel with piston 201 and abut the web 306 at a given travel point to add the spring resistance to the rightward motion of piston 201 when the brake-releasing force is fed to line 121.

The stem of 316 is hollow and has an opening at the left to space 317 and at the right to space 318. This permits compensator pressure supplied to line 392, to act in space 317 to thrust piston 201 to the left, and to act in space 318 to augment that thrust. Piston 201 acts against spring 322 when fluid pressure is admitted to chamber 310 by way of passage 121.

The pump supply system of the invention is worthy of brief examination. In Figure 3, the feed passage 185 leads from the pressure space of valve 180 to the interior of drum 3 of Figure 1, to maintain the working space W of the fluid flywheel 22—23 filled. The rearward projection of hub 24 (Figure 1) is fitted with a novel form of valve 91, having extended radial lip 92 on the folded portion, of greater net effective area than the forward portion on which spring 93 seats. Rise of pressure in the working space W acts differentially on the lip 92 and on the folded portion, against the force of calibrated spring 93, to slide valve 91 to the left at a given pressure, and expose the flow space 94 between the hub and the forward end of shaft 21 open to the longitudinal space between shafts 21 and 25. Fall of working space pressure permits spring 93 to seat valve 91 against the end of shaft 21.

The oil passing through the valve 91 to the space between the shafts is delivered to lubricate the running transmission elements through passages indicated at 96, 97 in Figure 1 and at 98, 98′, 197 and 198 in Figure 2. This oil is at a measurable pressure at all times due to the constant feed of the pumps P and Q of Figure 5 as well as the additional working space pressure generated by the rotors 22 and 23; hence the oil body is passing through the system at sufficient replacement speed to equalize the temperatures of the whole drive assembly. Pump Q is driven by the vehicle tail shaft. The spent oil falls into sump S which lies under the whole transmission mechanism, and by its large area provides heat radiation from the oil outside of, as well as inside of screen 410, from which the pump suction lines 388 and 389 of Figures 1 and 2 draw. Sludge plug 393 permits removal of dirt from the sump pan S without dropping the pan. A certain amount of heat removal occurs through the wall of drum 3, from the body of oil being pumped to the working space, to the air body circulated in the flywheel housing. There are therefore two heat flow areas, one, the sump pan S, the other, the drum 3, which serve to cool the oil prior to the heating effect of the fluid flywheel circulation around the space W.

While it is appreciated that forced feed lubrication systems for transmissions are old, and that cooling means for such forced feed lubrication are also old, it is believed that the particular arrangement of the applicant's invention in this respect, possesses features of novelty in stabilization of the temperature of the circulating oil body, in immediate transfer of the heated oil to the lubrication ducts for reducing the friction drag of a cold start, and in the making use of the sump pan and the enclosing drive drum for the rotor elements as radiators in the flow sequence described.

The gear train combination of the front and rear units with the fluid flywheel 22—23 and the reverse gear group provides four forward speed ratio ranges by actuation of the friction torque sustaining elements, brakes and clutches in the following pattern, the notation X indicating actuation.

|  | Front Unit | | Rear Unit | |
| --- | --- | --- | --- | --- |
|  | Brake 170 | Clutch | Brake 40 | Clutch |
| 1st | X | — | X | — |
| 2nd | — | X | X | — |
| 3rd | X | — | — | X |
| 4th | — | X | — | X |

In the lowest ratio, the front unit brake 170 is applied by fluid pressure in cylinder 159 beneath piston 160 for actuating piston 169, while the rear unit brake 40 is applied by the force of springs 314, 322 augmented by pressure in space 317 acting on piston 201. The carrier 20 of the front unit is the power output member, and transmits drive in the reduction ratio of the front unit through the fluid flywheel 22—23 to the input power member, sun gear 26 of the rear unit, when annulus gear 27 is held by band 40. The fluid flywheel 22—23 couples the two units at the variable slip ratio determined by the torque of shaft 21 and the speed of hollow shaft 6.

In second speed ratio, brake 170 is released while clutch 165—166 is being engaged to set up a 1—1 locking couple in the front unit, the hollow shaft 21 now driving impeller rotor 22 at engine speed. The drive train in low and second is a series drive, front unit to rear unit, as coupled by the fluid flywheel 22—23.

For drive in third, the front unit clutch 165—166 is released and band 170 re-applied, and the rear unit brake 40 released while clutch 167—168 is actuated. The drive train now divides the torque of hollow shaft 21, one component being sustained by the fluid flywheel 22—23, and the other by clutch 167—168. In the rear unit these torque components are combined, the first being delivered by sun gear 26, and the second by annulus gear 27 to drive output-connected carrier 30 forwardly.

Drive in fourth gear is obtained by release of brake 170 of the front unit while actuating clutch 165—166. The torque of the engine on hollow shaft 21 is divided, one fraction being delivered by fluid flywheel 22—23 to sun gear 26 at a speed averaging between 3 to 5 percent differential to that of the annulus gear 27 which rotates at engine speed.

In the first to reverse transition, the following pattern of actuation occurs:

|  | Front Unit | | Rear Unit | | Reverse Unit, Brake 130 |
|---|---|---|---|---|---|
|  | Brake 170 | Clutch 165-6 | Brake 40 | Clutch 167-8 |  |
| 1st | X | — | X | — | — |
| Reverse | X | — | — | — | X |
| 1st | X | — | X | — | — |

The carrier 52 of the reverse unit being connected to the load shaft 59, and the annulus gear 27 of the rear unit connected by radial web 51 to the reverse unit sun gear 55, the application of engine torque at a torque multiplication to central shaft 25 and to rear unit sun gear 26 first furnishes a backward rotation component to annulus gear 27, since the rear unit carrier 30 is stopped or at low rotational speeds. With reverse unit annulus gear 57 stopped by cone 130, the reverse component applied by reverse unit sun gear 55 causes planets 54 to roll around the annulus gear 57 in reverse direction, applying reverse torque to reverse unit carrier 52. As soon as reverse rotation of shaft 50 occurs, the rear unit carrier 30 partakes of the reverse rotation and the full reverse ratio of the combination becomes effective. The fluid flywheel 22—23 furnishes all of the reverse drive torque.

The above first-reverse-first shift pattern suggests that it would be extremely simple to negotiate this change directly; and rock a car out of a soft traction area, but, as will be understood further below, in changing from first to reverse, the front unit brake 170 is not continuously held engaged, but is actually released and re-engaged after reverse cone 130 is seated, and this interval is controlled by a timing valve 150, which compels this unusual form of operation. The return shift from reverse to low is, however, obtained by leaving brake 170 engaged, and by the releasing of cone 130 while brake 40 is being actuated.

As will be understood further, this transition shift for initial motion of the car from zero speed to forward or reverse may now be negotiated under controlled variable torque conditions, and the degree of torque reaction sustaining force made effective for the transition and drive intervals, is completely regulated and graduated by the controls, so that under no drive circumstances will there by any sudden jerks or lurches of the drive, nor any positive drive shocks or ratcheting action such as experienced with toothed pawl mechanisms.

The embodiment of the present disclosure includes a positive jaw or toothed brake pawl member 236 for the drum 58 of reverse unit annulus gear 57, but it is not used to establish reverse drive torque reaction. The pawl 236 is pivoted to lock teeth 62 against rotation and is actually spring pre-loaded for such action when the control for actuation of reverse cone 130 is set to establish reverse drive, yet is not utilized as a reverse drive brake. Only when the engine stalls, and the vehicle is at or near standstill, is the pawl 236 automatically engaged. This action is described in full in connection with Figures 11 and 12, and contributes substantially to the safety of vehicles in operation on mountain roads. If the engine stalls, front pump P no longer supplies servo pressure to load front unit brake 170, and the latter will be released by its springs 287, 297. Also, if the car is at or near standstill, the rear pump Q cannot supply the deficiency at low or zero speeds. However, the fall of line pressure also releases brake 40 of the rear unit from its holding-off pressure, and springs 322 and 314 apply it to the drum 31 of annulus gear 27. If at that interval, the reverse unit annulus gear 57 is locked by pawl 236, the coupled elements of the rear and reverse units provide a safety brake effect sufficient to prevent a car from drifting backward downhill, for example, likewise effective to prevent forward drift downhill, as will be understood from study of the drive connections.

To understand this acation, it is useful to remember that the carriers 30 and 52 of the rear and reverse units are fixed to the shaft 50. A rotational force coming from shaft 50 will endeavor to force planets 28 to roll around the annulus gear 27 held by brake 40, and if such motion be permitted, spin the sun gear 26 at overspeed in the same direction. However, with sun gear 55 of the reverse unit also stopped by brake 40, and annulus gear 57 stopped by pawl 236, the locking couple thus established in the rear unit will prevent rotation of carrier 52 and shaft 50. There is, therefore, automatic, positive braking of the vehicle motion, rendering it impossible for a car to run downhill out of the control of an inexperienced driver.

Now if the engine be stalled, as with a weak starting battery in cold weather, the need for a towing start must be considered. At a given road speed, rear pump Q delivers a line pressure to the servo system. Since brake 40 of the rear unit is always engaged by its springs 322 unless fluid pressure is supplied to hold it disengaged, it is only necessary to consider what energization control pattern is required to cause a friction member of the front unit to be actuated.

Figure 5B:
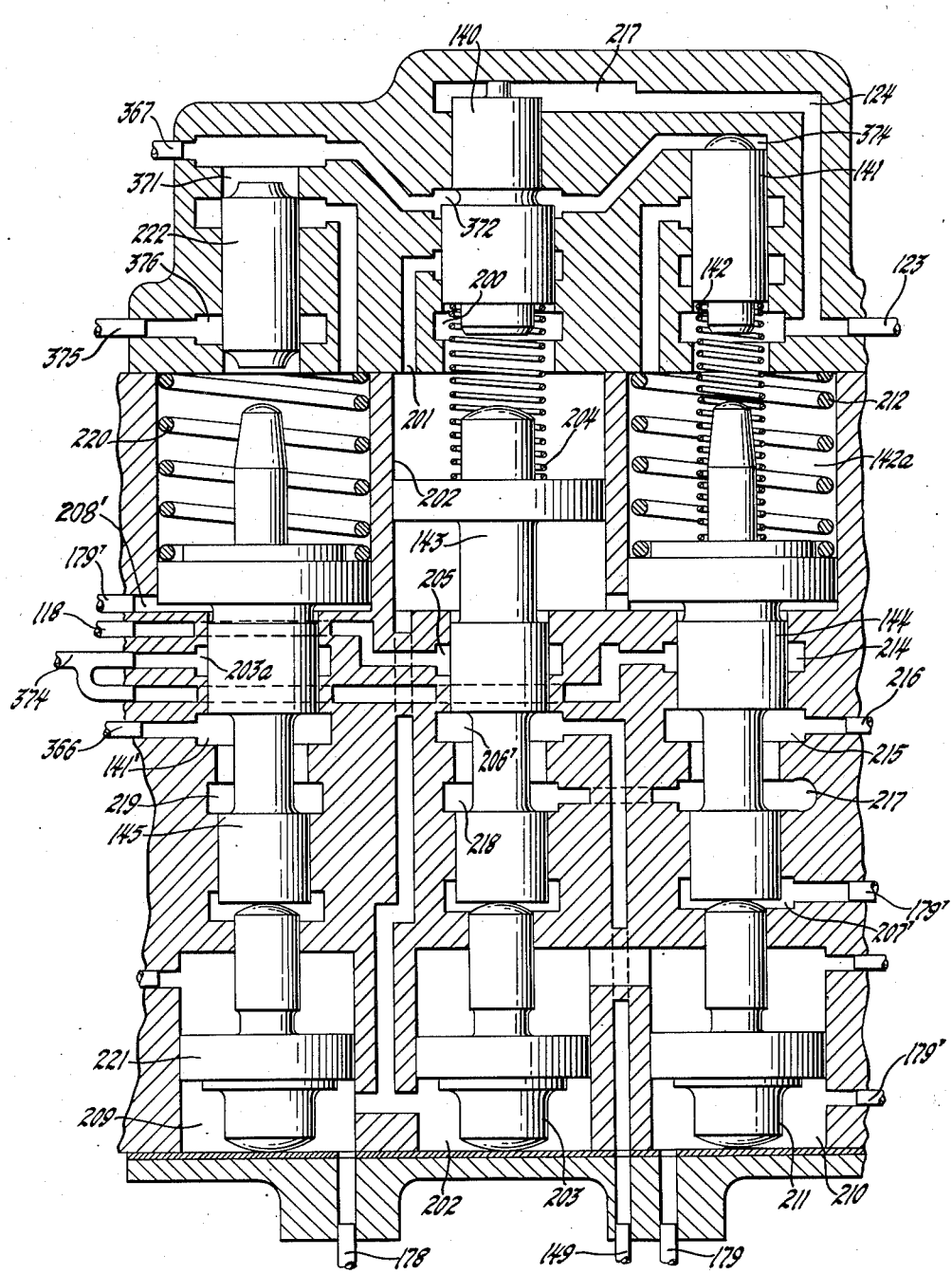
Figure 5b is an enlarged view of the control valving shown at the right hand side of Figure 5, to more clearly illustrate the valve details.

The governor G of Figures 5 and 6 will operate to provide a metered pressure to the spaces 210, 202 and 209 of the shifter valves 143, 144 and 145 shown in Figure 5b, at its normal speed calibrations, and therefore at about 12 miles per hour, with the manual valve 100 of Figure 5 set for forward automatic drive, will cause the 1st to 2nd shifter valve 143 to rise and deliver line pressure to actuate clutch 165—166 of the front unit, when the drive will be in second speed ratio. If the output of pump Q is so controlled by the regulator valving 180 and 187 of Figure 6, that its net effective pressure and capacity are below the values needed to establish second speed ratio, the operation of coupling to the engine may be obtained at about 18 miles per hour, when the governor pressure is sufficient to move the 3rd and 4th shifter valve 145, and cause actuation of both of the front and rear unit clutches.

The structures diagrammed in Figure 5 are the actuator and control devices and units for the ratio-establishing friction members of Figures 1 to 4, and the control mechanisms and valving required for their proper operation. The cut-away sections of clutches 165—166 and 167—168 are duplicates of the Figures 1 and 2 showings and the ratio servo brake actuator mechanism sections reproduce those of Figures 2, 3 and 4. The pump P of Figures 1 and 3 is shown in the lower left corner of Figure 5 and pump Q of Figure 13 in the lower right corner, with the governor G.

In the center of Figures 5 and 5b, the right-hand control panel includes the shifter valving which directs the pump pressure to the servo clutch and brake actuating mechanisms, and the pressure-responsive elements acting as control servo operators for the shifter valving. The left-hand center panel of Figure 5 and Figure 5a shows a manual control valve 100, a cooperating timing valve 150, a pressure-regulating valve 350 operated by the engine speed control mechanism controlled by the accelerator pedal, a compensator pressure control valve 380 subject to variable pressure applied by the accelerator operated valve 350, a double-transition valve 250 also subject to variable pressure applied to it for obtaining a ratio pressure directing and inhibiting effect, and various pressure-area thrust plugs and calibrating springs, described further below, in connection with the outlined control and actuating pressures.

Pressure for operating the servo mechanisms as distinct from the control pressures, is supplied from pump main 115 through lines 118 and 347 to ports 205, 214 and 203a (see Figure 5b) of the shifter valves 143, 144 and 145 which slide vertically upward in the valve body bores, from the positions shown, to connect the servo ports 214, 205 and 203a, respectively to the servo delivery lines 216, 149 and 366. Specifically, line pressure is fed to port 205 of shift valve 143 by way of line 115, and branch line 118. Pressure is fed to ports 203a and 214 of valves 145 and 144, depending upon the position of manual valve 100, by way of line 115, branch line 117, line 119, and line 374 (see Figure 5). The shifter valves in the lower positions shown vent the servo ports at exhaust ports 217, 218 and 219, respectively, shown in Figure 5b.

Springs 212, 204 and 220 tend to hold the shifter valves in the exhaust positions, and plugs 203, 211 and 221 are moved upward against the spring force by governor-supplied pressures to the lower spaces 202, 210 and 209 by passages 178 and 179, of Figure 5b.

Shifter valve 143 delivers pressure for establishing the upshift from low to second and is noted as the 1st to 2nd shifter. Similarly valve 144 is the 2nd to 3rd shifter and valve 145 the 3rd to 4th shifter.

At the upper end of the valve body is located a set of control plugs, the plug 140 acting against spring 204, the plug 141 against spring 142 and the plug 222 which may be moved to contact the upper extremity of the stem of valve 145. A variable control pressure is made available by the valving of the left hand panel, to move the plugs 140, 141 and 222 against the springs 204, 142 and against the stem of valve 145 to oppose the forces applied by the governor plugs 203, 211 and 221 tending to upshift the shifter valves.

It will be understood that assuming a speed-responsive pressure rising with speed is made available to the governor plug spaces 202, 210 and 209 to move the shifter valves upward against the springs 204, 212 and 220, the springs may have a designed set of rates such that valve 143 will rise first, at a given governor pressure, since spring 204 is of a rate to permit the action at a relatively low pressure; then valve 144 will next rise, and finally valve 145, so as to cause ratio upshift from first to second, to third, and then fourth.

In order to provide the driver with some means to delay this upshift action of the governor, and compel the vehicle speed to rise to higher ranges before the upshift sequence of ratio steps is negotiated, the variable pressure applied above plugs 140, 141 and 222 is derived from a control valve 350 which is moved in accordance with the power demand made by the driver in advancing the engine accelerator pedal. This arrangement enables the automatic ratio controls to be calibrated for a normal speed controlled shift pattern in which the ordinary and normal accelerator pedal motion is related to the effective speed shift points for the governor pressures, so as to obtain an economy type of engine operation in which the upshifts occur over a range of governor speeds with respect to engine speeds. This permits the drive to operate in the higher transmission ratios, for longer periods, so that for a given set of traffic on road circumstances, at selected car speeds during a measured time, the engine R. P. M., is at an optimum for fuel economy.

For drive intervals in which the driver wishes to overcome the normal economy calibration equilibrium of the controls, and set aside economy operation in favor of acceleration and performance, advance of the accelerator pedal to maximum range increases the downshift pressures acting on plugs 140, 141 and 222, so that the engine is speeded up to higher torques and speeds for given car speeds.

TRANSMISSION AND FLUID PRESSURE CONTROLS

Reverse shift control

The control diagram of Figure 5 shows a special new form of manual valve 100 which performs novel functions in reverse gear setting. The regular driver's steering column control linkage moves the valve 100 to the "R," "L," "D," "N" positions as indicated in Figure 5a.

Manual valve and porting

The ports of manual valve 100 are numbered in order from top to bottom 101 to 110.

Pump delivery lines

The pumps P and Q deliver via lines 196 and 81 through check valve 111 to the pump line 115, branched at 116 for the governor; at 117 to valve port 107; and at 118 to the feed port 205 of the 1st to 2nd shifter valve.

Line 117 has a side branch 119 connected to valve ports 102 and 103.

Manual valve structure

As indicated in Figure 5, the valve 100 has end closure boss a, intermediate bosses b, c and d, and a reduced upper end boss of tapered form e, which also serves as an exhaust relief pass since its cylindrical dimension is less than that of the bore for valve 100.

As shown in Figure 5a, pump line pressure enters port 107 and may exit at port 106 to line 120 leading to the inlet port 155 of timing valve 150.

Rear unit brake hold-off action

Pressure from branch line 119 in port 102 is dead ended, but that in port 103 may pass between bosses d and c of valve 100 to port 104 and to line 121 leading to the left end of the rear servo cylinder 200, to deliver release pressure to the rear unit brake pistons 201 and by 121a to move piston 312.

Shift prevention pressure

The branch 122 of line 121 connects to the lower end of the bore of the double transition valve 250.

The pressure admitted by line 117 to port 107 also passes downward to ports 108 and 109.

That in port 108 goes by line 123 to the port space 142a between the 2nd to 3rd regulator plug 141 and the 2nd to 3rd shift valve 144, and by line 124 to the end space 217 for the 1st to 2nd regulator plug 140, for reasons explained later.

Pressure in port 109 passes by line 125 to the blade-type check valve 126 (see Figures 5 and 5c) and by line 127 to the cylinder port 128 for reverse unit piston 129, to move same against spring 131 and apply the cone surface of 129 against the reverse cone 130 and clamp same to the fixed cone 132. The cylinder space is 133.

Timing valve

Before this action can occur, the action of the timing valve 150 needs consideration.

As shown in the drawing, spring 151 as in the Figure 5 and 5a views of 150, is holding the valve 150 to the right.

Valve 150 has a hollow end boss F, a central boss g and a reduced diameter boss h, as shown in detail in Figures 7, 8 and 9.

Inactive setting—figure 9

In other than reverse setting of the manual valve 100, the boss d of valve 100 moves valve 150 against spring 151, farther left than shown in the Figure 5 view of 150, and in reverse setting the force of spring 151 acts as shown in the Figure 5 view. The Figure 7 view shows valve 150 in metering position.

The ports for valve 150 are from left to right 152, 153, 154, 155 and 156.

Pump line pressure in line 120 and port 155 cannot perform any direct action on valve 150 since bosses F and g are of the same diameter. Boss g has a slight taper portion g' at the right where it intersects port 156.

Initial valve action

The delivery of reverse servo pressure to line 125 also delivers to branch line 134 leading to port 156 where the slight differential area at g' permits a small pressure force to tend to move valve 150 to the left against spring 151.

It will be noted that at this time, with valve 150 in right hand position, the front servo feed line 158 is not connected to the pressure feed port 155, being blocked by boss F, and is connected so as to bleed to exhaust port 153 by passage 157 (see Figure 5a).

The movement of manual valve 100 to the reverse setting of Figure 5 delivers pump line pressure to line 125 as noted above, and there is a time interval of filling of the cylinder space 133 of the reverse cone piston 129, at the end of which the reflection of the resistance of springs 131 results in a measured rise of pressure in branch line 134 and port 156. This starts valve 150 to move left against spring 151, completely closing exhaust port 153, and opening port 154 to pressure feed port 155. The resulting delivery to front unit servo line 158 is felt by piston 160 in servo cylinder 159, and the front unit band 170 is applied.

Timing valve action

The timing action of valve 150 prevents the front unit band 170 from being applied until after the reverse servo piston 129 is properly applied to stop the reverse unit reaction member 130. This timing action assures that there will be no torque reaction bumping noises, contributing to smoothness of operation, such that it now becomes relatively easy for the driver to rock the car in reduction forward and reverse without shock and without abuse of the mechanism. Valve 150 serves another purpose to be described below.

Upon shift from "reverse" to "low," the nose e of valve 100 strikes the end boss h of valve 150, compresses spring 151 and puts the valve in a position farther left to that of the Figure 9 view, so that this moves the valve 150 to the exhaust shut-off position for ports 154 and 153, and the spring 151 is fully compressed.

Metering valve action

The upper half Figure 5a shows the valve 150 with valve boss F near the right edge of port 154, so that a slight rise of pressure in port 156 may provide a slight feed to port 154 and servo line 158. At the same time, the lower left end of boss F has been moved to seal off exhaust at port 153, and the existing pressure in port 154 is transferred by passage 157 to the left face of valve 150, tending to assist the spring 151, and build up a force tending to close off feed from 155 and 154, and expose ports 154, 157, 152 to drain at 153. This metering action of pressure from 155 to servo line 158 acts continuously after the rise of control pressure in port 156 has signaled that the reverse cone piston 129 has seated, and consequently the variation of line pressure in 155 is paralleled and repeated in servo line 158 during the period when brake piston 160 is applying the band 170 of the front unit.

Check valve operation

The check valve 126 of Figure 5 is of uncommon nature and provides a pressure response effect of particular utility in the providing of control pressures in all of the lines where pressure variation is needed for smooth operations.

As shown in Figure 5c, the valve casing 136 shown in section has an orifice 138 at the point of entry of line 125, and the blade valve 126 has an orifice 137 of smaller dimension than that of orifice 138. The diameter of orifice 137 is preferably one-half that of orifice 138. The flexible blade 126 is fulcrum-pinned to a projection of the casing 136, and its spring action is calibrated to yield at a predetermined pressure from line 125.

When the initial rise of pressure in line 125 occurs, the quantity of oil per unit time flowing through to line 127 is regulated by orifice 137 in the blade 126 a small amount, the action permitting a measured rise of pressure in 125 and in the other lines such as 134 and 122. At a given pressure, the blade 126 is flexed open by the pressure, and the effective larger orifice 138 now controls the rate of filling of cylinder 133. This action causes a momentary line pressure drop during the filling interval, so that timing valve 150, for example, is unable to feed servo pressure to front unit cylinder 159, to apply band 170, since the control pressure in port 156 is not high enough to overcome spring 151.

As will be noted by reference to Figures 10, 11 and 12, the parking brake pawl member 236 is spring biased when the manual valve 100 is placed in "reverse" to tend to cause teeth 238 to engage teeth 62 of drum 58 to provide a vehicle parking brake. Pawl member 236 is, however, prevented from moving to cause teeth 238 and 62 to engage by means of blocker piston 240 (see Figure 11) which is caused to move outwardly against the action of spring 241 by action of fluid pressure admitted behind the piston through line 116 (see also Figure 5). It has been found that in the absence of valve 136, the pressure requirements of the reverse cone actuating cylinder may be such (particularly at low vehicle and engine speeds) as to cause a pressure drop in line 116 sufficient to permit the parking brake to be prematurely engaged. Check valve 136 restricts the initial rate of build up of pressure in chamber 133 of the reverse cone piston, thereby preventing unduly rapid pressure drop in line 116 and preventing this undesirable premature engagement of the parking brake. With this arrangement, the parking brake may not be engaged until the vehicle motion is stopped and the engine turned off so that neither the front nor rear pumps supply pressure to line 116.

Reverse servo boost

The rise of control pressure in branch line 134 is also provided in the extension of line 125 leading downward to the control plug assembly for the front unit pump P.

Regulator valve 180 of Figures 3 and 5 has small boss e, larger boss j and an end plug k serving as a spring retainer and a thrust member.

The pump housing 181 is ported at 182 to communicate with the pump delivery passage 185 and at port 184 is connected to deliver pressure to line 185 leading to the fluid flywheel working space W, and connected at 186 to act upon by-pass valve 187. The inner pressure space 188 is bleed connected to space 183.

Valve 180 relieves working space pressure above a given p. s. i. to exhaust passage 189 shown in Figure 5, the calibrated spring 190 measuring the desired relief force.

Plug 191 is recessed in a bore of screw plug 192, threaded into the casing, and plug 191 acts as an adjustment for spring 193 which regulates the pump line pressure. The bore 194 of plug 192 is closed at the outer end and connected by passage 195 to servo line 125.

When a sufficient rise of pressure in line 125 has caused the piston 129 to seat the reverse reaction brake cone 130, the reflection of that pressure is felt in line 125, and plug 191 presses directly upon regulator valve 180 preventing its regulating action so that full pump delivery occurs in line 196, lines 115, 117, and line 120. This increase of pressure is applied by line 158 to servo cylinder 159 of the front unit to force piston 160 against the brake applying linkage for maximum brake holding force, when a maximum pressure demand occurs. The metering action of valve 150 tends to reduce the pressure force on the front unit band 170, so that any controlled slip will be taken on this band instead of cone 130.

Since the reverse brake torque reaction force to be sustained is high, this extra pressure is available to hold the front unit brake band 170 and the reverse cone 130 against excess slip under all circumstances.

*Terminal reset of metering action*

A peculiar resultant of the forces involved occurs in the operation of the front unit band. If while driving in reverse, the operator decelerates the engine and the reaction torque on the front unit band 170 be reversed, the mechanical force of the band is reflected in a rise of thrust tending to move piston 160 back against the pressure of servo line 158. This raises the value of the metered pressure acting on the left face of valve 150, and may exert sufficient force to vent the space 151 to exhaust at 153. The useful result of this characteristic is to recondition the servo action for soft application during the next reverse drive interval, when the operator continues to require reverse vehicle motion.

*Valve cut-off position*

It should be made clear that when timing valve 150 is in locked out position by boss e of valve 100 as in Figure 9, there is permanent connection between ports 155 and 154, providing servo pressure in the lower end of cylinder 159 tending to raise piston 160 to brake band actuating position. This eliminates the metering action of valve 150.

*Safety hydraulic interlock against upshift during reverse drive*

Reference was made above to pressure in lines 123 and 124 leading to the 1st and 2nd regulator plug 140 and to the port space 142 above the 2nd to 3rd shift valve 144.

From preceding acquaintance with patents such as U. S. Letters Patent to Earl A. Thompson 2,204,872, it will be perceived that the present arrangement of shift valve elements is in the line of teaching of such preceding versions.

The 1st to 2nd shift valve 143 controls the delivery of servo pressure to line 149 and hence to lines 139 and 139' to apply the front unit clutch 165, 166 and take off its brake 170, or relieve that pressure from lines 139 and 149. The 2nd and 3rd shift valve 144 controls the delivery of pressure through line 216 to apply the rear unit clutch 167, 168 and relieve the front unit clutch line pressure in line 139, as assisted by the double transition valve 250. More specifically, with the manual valve 100 in "drive" position, pressure in passage 216 and 216' is supplied to passage 121 and branch passage 122 through ports 105 and 104 of the manual valve. Pressure in line 121 releases the rear band while that in 122 raises the double transition valve to its "up" position whereby front band release passage 139 is connected to passage 366 through ports 208 and 209 of the double transition valve. Passage 366 is connected to exhaust port 219 of the third to fourth shift valve 145.

With no control pressure force applied to either of shift valves 143 or 144, they will remain as shown in the drawing Figure 5.

However, governor unit G is permanently driven by the transmission driven shaft 50 as shown in Figure 13, and will rotate during either forward and reverse drive, signaling its valves 174 and 175 to operate, and since feed line 116 is permanently connected to the governor feed ports 75 and 76, if the car speed rise high enough, the governor G could supply control pressure in metered pressure lines 178 and 179 which would signal valves 143 and 144 to move upward, an undesired upshift result.

In the case of the 1st to 2nd shift valve 143, lifting pressure from line 178 acting in space 202 on plug 203 against spring 204, could cause connection of feed port 205 of line 118 with delivery port 206' of line 149 leading to port 207 of the double transition valve 250, and as shown, deliver through port 208 to line 139. The latter line 139 is connected to line 139' to apply clutch 165, 166 of the front unit and equalize pressure in space 285 above front unit brake piston 160 to release band 170.

In the case of the 2nd to 3rd shift valve 144, lifting pressure from governor output line 179 in space 210 on plug 211 against springs 212, 142 could expose feed port 214 to delivery port 215 and line 216 leading to the rear unit clutch cylinder 220 to apply piston 219 to load the clutch 167—168, a further undesired result. Governor pressure from space 210 is conducted by passage 179' to port 207' beneath shift valve 144 and also to port 208' beneath the large piston of shift valve 145, further tending to upshift the valves.

The pressure in line 123 from port 103 of valve 100 acts in space 142a of the 2nd to 3rd shift valve 144 to hold same down against any governor pressure in space 210, and acts in space 217 open to branch 124 to hold down plug 140 to bear on the upper end of the 1st to 2nd shift valve 143, and perform the same function.

A further feature prevents such undesired upshift control action. The line 121 of port 104 of valve 100 connects to the rear unit servo cylinder 200 to prevent the rear unit brake from being applied.

The branch line 122, as noted, connects to space 121 below double transition valve 250.

As shown in Figure 5, port 207 of line 149 is open to port 208 of line 139 leading to equalizer space 285 above the front unit brake piston 160. When the control pressure of line 122 in space 121 lifts valve 250, its boss m closes port 207, completely blocking any effect of a false governor signal which could apply the front unit clutch and release the brake 170. Thus, even though the first to second shift valve 143 may be moved by governor action to deliver fluid pressure to line 149, the manual valve, in its reverse position supplies line pressure through passage 122 to chamber 121 of valve 250, this pressure causing valve 250 to block off passage 149 from passage 139 so that no pressure is delivered to chamber 285 of the front servo. The front band therefore remains applied through fluid pressure acting in chamber 286.

*Operation, Figure 5*

With the Figure 5 control system, when the car is standing with engine stopped, there is no servo pressure and springs 237 and 331 hold the front unit band 170 and clutch 165—166 released. The rear unit clutch 167—168 is held released by spring 332, but springs 314, 313 apply band 40 to drum 31, to hold the rear unit in reduction.

When the controller handle 500 of Figure 14 is put into "neutral," and the engine started, the front unit pump P begins to furnish servo oil pressure to line 196 and through check valve 111 to lines 115, 116, 117 and 119.

This pressure is delivered through ports 102 and 104 to line 121, for applying force to release the rear unit band 40. At this operating stage, there is no drive.

With the controller 500 put in the "drive" range position, the manual valve 100 is stationed for four-speed automatic drive. The pressure of line 121, which was holding the rear unit band 40 released, is now exhausted at exhaust port 217 of shift valve 144. Pressure from line 121 is admitted to line 216 by way of ports 104—105 of manual valve 100 to branch line 216' communicating with line 216. Line 216, in turn, communicates with exhaust port 217, the port 215 of shift valve 144 being in communication with exhaust port 217 when the valve is in its second speed position. Pump line pressure is now directed through ports 107—106 of manual valve 100 to servo line 120 and through port 154 of timing valve 150 to line 158 to apply the front unit band 170 to drum 14. Neither of clutches 165—166 nor 167—168 are at this time servo supplied. Pressure now becomes available to the shifter valves 144, 143 and 145, but no control pressure is yet supplied to cause them to deliver for upshift. Specifically, with manual valve 100 positioned for "forward" drive, line pressure from pump delivery line 115 is furnished to port 205 of the 1st to 2nd shift valve 143 by way of branch line 118 extending from line 115. Pressure is supplied to ports 203a and 214, respectively of shift valves 144 and 145 by way of passages 115, 117, 119 and passage 374, the land or boss d being positioned to permit fluid pressure communication between passages 374 and 119.

With engine rotation, and both bands 170 and 40 furnishing torque reaction, the car will be in forward motion, causing the governor G to begin to deliver control pressure in accordance with speed, to spaces 202, 210 and 209 under the plugs 203, 211 and 221 of Figure 5b.

The rise of governor supplied pressure in space 202 under plug 203 will cause the 1st to 2nd shifter valve 143 to rise, feeding line pressure from port 205 to port 206' and to line 149, which feeds through the double transition valve 250 to the cylinder 42 of the front unit clutch through line 139' and by way of line 139 to the pressure spaces 285 and 285' of the front unit brake actuator. This assists spring 287 and overcomes the pressure in space 286 from line 158, so that pistons 160 and 283 move down to release the band 170. This provides second speed gear drive, as explained above.

Further rise of governor pressure creates a different control pressure situation, since as above explained, when the upshift to third is made, it is necessary to make a change of actuation of the friction members in both of the front and rear units. The governor pressure rise is applied to plug 203 of the 1st to 2nd shifter valve 143, and to plug 211 of the 2nd to 3rd shifter valve 144. To negotiate this 2nd to 3rd shift, the double transition valve 250 is required. The motion of the 2nd to 3rd shift plug 211 causes valve 144 to move to connect feed port 214 to delivery port 215, and feed line 216 for applying clutch 167—168 and releasing the rear unit band 40 through ports 105 and 104 of manual valve 100. This feed passes through lines 122 to the space 121 of the double transition valve 250. This force shifts valve 250 to cut off ports 207 and 208, so as to cut off line 139 from line 149, the pressure of which has been holding the front unit band 170 disengaged, and the clutch 165—166 engaged. Pressure in line 139 is exhausted by way of port 209, line 366, and exhaust port 219 of 3rd to 4th shift valve 145. Removal of servo pressure from the cylinder spaces 285 and 285' of the servo cylinder 159 permits the pressure of line 158 to overcome springs 287, 297 and re-engage band 170 of the front unit. This establishes third speed ratio, as explained above.

Final rise of governor pressure is exerted to move the 3rd to 4th shifter valve 145, to move valve 145 to connect port 203a with port 141' leading to line 366 open to port 209 of the double transition valve 250. Since the latter is held in its upper position by pressure in space 121 acting against spring 383, the port 208 communicating with port 209 delivers line pressure from line 366 to servo line 139 for releasing the front unit brake 170 and applying the clutch 165—166. With the 2nd to 3rd shift valve in its "up" position, pressure is admitted to line 216, branch line 216', through ports 105—104 of the manual valve to line 121, and line 122, this pressure acting to raise the valve 250. With both clutches 165—166 and 167—168 engaged, the drive is in the fourth, or top gear ratio.

The foregoing description has been outlined as if the whole automatic upshift action derived from the increased speed action of the governor unit G. The counteractive action provided by the accelerator-pedal-connected elements, will be now described.

The valve 350 of Figure 5 is operated by lever 351 of shaft 352, against spring 353; and also shown in Figures 5a and 10. In addition to the two main parts I and II (see Figure 10) of the valve 350, there is a separate detent plug 354 (see Figure 5a) in the upper end of the bore 355. The valve parts I and II are separated by spring 353 except when other forces are applied to compress the spring. The portion I is hollow at one end, inside boss t to accommodate spring 353, has a boss u and a protruding stem v against which pedal-connected lever 351 operates. The portion II is hollow at the lower boss w end to accommodate spring 353 and has bosses x and y, the upper end portion z being a stud to cooperate with the inner end of detent plug 354. Pressure is admitted to port 360 of valve 350 by way of passage 119 and line 374 when manual valve 100 is placed in its "drive" or "low" range position. Each of the shifter valves 143, 144 and 145 is equipped with a throttle-pressure-responsive plug 140, 141 and 222, connected to respond to the pressure of control line 367. This pressure increases with increased throttle setting, and is a metered pressure derived from the positioning of the valve 350.

The ports of the valve assembly 350 from top to bottom of Figure 5 are 356, 357, 358, 359, 360, 361, 362, 363, 364 and 365.

The outermost or upper port 356 receives pressure along with port 209 of valve 250, when the 3rd to 4th shifter valve 145 is delivering to line 366 and port 209 of valve 250.

The second port 357 is exhaust.

The third, fourth and fifth ports, 358, 359 and 360, are connected to passage 367 joined to the spaces 371, 372 and 373, respectively, of the shift valve plugs 222, 140 and 141.

The sixth port 361 is connected by passage 374 to pump line pressure from ports 101 and 102 of manual valve 100, when the latter is in forward drive position.

The seventh port 362 is a vent space for the chamber of spring 353 between the valve sections I and II.

The eighth port 363 is connected to line 139 through port 208 of the double transition valve 250.

The ninth port 364 is connected by passage 375 to port 376 of plug 222 of the 3rd to 4th shift valve 145, and feeds control pressure to the chamber of spring 220 above valve 145 during full throttle downshift.

The tenth port 365 is an exhaust port.

Above the valve 250 in the same bore axis is the compensator valve 380 and plug 381. Pin 382 limits the upward travel of valve 250, retains spring 383 and limits the downward travel of valve 380, as spaced by the plug 381.

Valve 380 has a pair of bosses, is hollowed to accommodate spring 384 and may abut the upper end of two-boss plug 381. This assembly should be examined as a separate entity.

There are twelve ports along this axis.

The upper port 385 is connected to delivery passage 368 of valve 350. The second port 386 is open to exhaust. The third and seventh ports 387 and 391 are connected to passage 392 connected in turn to space 288 above piston 160 of the front unit servo cylinder 159, and to the space 317 inside piston 201 of the rear unit servo cylinder 200. Ports 388 and 390 are connected to passage 374, while port 391 is connected to passage 392.

The compensator pressure provided line 392 by valve 380 is controlled by throttle pressure applied in port space 385, and the compensator valve 380 in its turn meters the pressure of line 392 to chamber 391a beneath the compensator regulator plug.

At high torque demand by the operator, for full performance of engine and transmission, it is desirable that the net effective servo pressure to hold the torque-sustaining friction members engaged, be high, so as to prevent slip of the members, therefore in the front unit band servo cylinder 159, the compensator pressure of line 392 acts on piston 296, augmenting the brake holding force provided by line 158 to space 286 below piston 160. Likewise in the rear unit servo cylinder 200, the pressure of line 121 is delivered to space 310 to apply a thrust to load brake piston 201 and is made available through passage 121a, valve 307 to space 311 to load piston 312, the extension 316 of which is in abutment with piston 201, during certain phases of control operation.

During full throttle downshift when the transmission has been in third speed ratio and will shift to second, the rear unit clutch cylinder 220 is vented, and the band 40 applied both by the force of springs 314, 319 and by compensator pressure of line 392. The accumulator check valve 307 ordinarily acts to lengthen the time of release of clutch 167—168 and band-hold-off pressure in the rear unit, hence under sudden downshift signal at full power there are now established conditions under which this time delay is undesired, since it would possibly cause band 40 to slip. To avoid this, and to speed up the downshift interval, the application of compensator pressure from line 392 to space 317 of the rear unit cylinder 200 moves piston 308 which raises check valve 307 off its seat, and a quick venting of the oil in space 317 results.

Under heavy load, and a slowing down of the vehicle, the governor G may signal for a 3rd to 2nd downshift, when the throttle is nearly wide open, and the pressure in line 392, port 391 and the space 391a between the compensator plug 381 and valve 250 is capable of pushing the latter valve 250 to the bottom of its stroke so that the flow of servo pressure in line 149 from port 206 of the 1st to 2nd shifter valve 143 is properly lead to line 139 via ports 207 and 308 of valve 250, to release the front unit brake 170 and to apply its clutch 165—166.

The Figure 6 diagram is similar to that of Figure 5, and the elements of equivalent structure and operation bear the same numbers. A special feature differing from the Figure 5 arrangement is the inclusion of the use of a special variable pressure control for the servo line pressure provided by the pumps P and Q to the system.

The line pressure regulator valve 180 in Figures 3 and 5 is subject only to the pump pressure effects, the force of spring 193 and to the action of plug 191 energized by fluid pressure directed to port 195 by line 125 from valve port 109, when valve 100 is stationed in reverse position. The arrangement of plug 191 is repeated in Figures 3 and 6, and there is a second plug 394 in bore 194 acted upon variably by control pressure furnished to space 396 from port 397 connected to control line 367. This line 367 is supplied and controlled from delivery port 360 of valve 350, the action of which is described in connection with the Figure 5 arrangement.

This variable pressure, increased and decreased with the throttle advance and retarding action of the accelerator pedal, is applied to establish a variable resistance or force to the response of regulator valve 180 to the pump delivered pressure, so that instead of the valve 180 tending to hold a steady line pressure, as in Figure 5, it is constantly acting under variations of the pressure applied to plug 394, and provides the result of a continually variable line pressure varying with the torque demand, as expressed by the operator's advancing and retarding of the accelerator pedal.

One particular advantage of this facility is the ability of the servo supply to respond quickly to a need for extra pressure and extra capacity. For sudden torque demand signaled by rapid accelerator pedal advance, since the torque of engines in motor cars, rises with speed, and since such advance is capable of requiring a downshift ratio change, it is possible for the fluid pressure force need to sustain the loading on one of the friction members, to rise to a value exceeding 30 percent of normal. This feature, for this purpose, provides the facility to create the needed additional pressure over normal need, so that the servo pressure to hold against slip, is available prior to the rise of torque or torque reaction at the point where the friction members sustain the drive, such as band 170 and drum 14 of the front unit.

Under upshift ratio change intervals when the accelerator pedal may be held stationary or retarded, the need for such holding force diminishes, and the drop in pump line pressure caused by retardation prevents slamming of the clutch and brake operating mechanisms involved with more servo force-per-time than required to hold, and also prevents a too rapid rise of such force such as would fail to dissipate inertia forces, which phenomenon otherwise causes uncomfortable, abrupt changes in the vehicle acceleration and deceleration.

There is also a somewhat quicker response throughout the whole control system, since the net effective fluid pressure control forces increase while the fixed, calibrated spring forces remain the same. It also occurs that the overall tendency of the ratio controls to establish drive in the lower ratios is slightly increased.

Since modern vehicles are operable on super-highways at road speeds above 70 miles per hour, for long time periods, it occurs that the accessory drive mechanisms operated by the power of the engine consume considerable horsepower, therefore when the variable pump line pressure needs are satisfied, a small saving of horsepower is made, since the pump line is not operated at full pressure demand except during infrequent ratio changes.

Another additional feature is shown in Figure 6, that of providing selective ranges of available ratios, in which the lowest of four forward speed ratios is reserved for manual valve selection, automatic selection in the hand control range being curtailed to choice of lowest or second speed ratio, while the normal automatic drive range includes initial drive in second speed with upshift to third and fourth. This feature is especially useful in vehicles having engines of sufficient power to provide initial drive in second for normal needs, yet enables the driver to choose initial drive in lowest ratio when the traffic or road requirements require it.

This form of control obtains from the special arrangement of the manual and shifter valve ports 108 and plug 140, and the use of a biasing spring 202' beneath the 1st to 2nd shifter valve 143. When manual valve 100 is shifted from neutral to the "D" position, the pump line pressure of port 101 in line 374 to port 205 of valve 143 is already connected to port 206 and line 149 for applying front unit clutch 165—166 and holding brake 170 disengaged, therefore the drive starts in second speed ratio, and subsequent rise of vehicle speed causes governor G to supply control pressure to shift the 2nd to 3rd valve 144 and the 3rd to 4th valve 145, to establish the higher ratios, as modified by the pressures applied to plugs 141 and 222.

Figures 7 through 9 illustrate the relationship between the timing valve 150 and manual selector valve 100 whereby the timing valve is gradually moved from its operating position illustrated in Figures 5 and 5a wherein the manual valve 100 is positioned to select "reverse"

to the position of Figure 9, wherein the timing valve is in its full non-operating position. It will be noted that as the manual valve is moved upwardly from its reverse position, through its "low range," "drive range," to "neutral," the cam surfaces e and d are stepped so that the action thereof is gradual. Thus, in Figure 7, port 154 is "cracked" but not fully open so that the admission of pressure from line 120 to line 153 is gradual and without a large surge of pressure. The application of the front planetary unit band is therefore gradually and smoothly accomplished. In Figure 8, port 154 is opened a greater amount than in Figure 7, while in Figure 9, wherein the manual valve 100 is positioned for "neutral," the timing valve 150 is fully non-operative.

In the Figure 10 view, there are two concentric control shafts 231 and 352 individually operated by the external control linkages of Figure 14. The shaft 352 has affixed lever 351, and is operated by the linkage 401, 402, 404, 405, 406 from the accelerator pedal 400 of Figure 14, and swings the lever 351 of Figure 10 clockwise with increase of throttle setting by the pedal. This motion moves valve 350 against spring 353, to control the compensator pressures and overcontrol the regulation of line pressures as described elsewhere in the specification.

Referring to Figure 14, when the accelerator pedal 400 is depressed, motion is transferred through linkages 401, 402 and 403 to rotate plate 404 about pivot pin 407, thereby moving stub shaft 408 and block 409, causing link 405 to move to the left, to thereby impart clockwise motion to shaft 352 through link 406.

Shaft 231 is rotated by linkage 501, 502, 503 and 504 from the controller handle 500 of Figure 14. In Figure 10, shaft 231 is shown fastened to lever 230, formed at 234 into a cam edge 264 intersecting poppet 235 recessed in casing 199 and loaded by poppet spring 235'. Pin 232 is riveted to lever 230 and moves in an arc to cause manual valve 100 to reciprocate. Valve 100 is shown in the forward drive position in Figure 10.

Lever 230 is a stamping having a turned edge leg or projection 267 at the right, and a second turned edge leg 268, lower and to the left, with an open portion between the turned edges. When the hand controller 500 of Figure 14 is moved to reverse position, the manual valve 100 is shifted to the right by pin 232, and this counter-clockwise rotation of lever 230 swings the turned edge 267 upward to pass the parking brake control member 251. The lower turned edge 268 catches the rolled or curved edge 263 of lever 251 and rotates the latter upward and toward the edge of the observer, this action winding the spring 253, thereby biasing parking brake pawl 236 to tend to engage teeth 238 with teeth 62 of drum 58. As heretofore explained, the parking brake remains inoperative so long as fluid pressure in line 116 moves blocker piston 240 outwardly to prevent rotation of the pawl. However, when the pressure in line 166 is released, as when the vehicle is stopped and the engine turned off, spring 241 moves blocker piston 240 away from pawl 236, thereby permitting spring 253 to cause the pawl to move to engage teeth 62 and 238.

*Safety brake-external connections (Figures 10, 11 and 12)*

The safety parking brake pawl and its operating mechanism is controlled by the lever 230 of shaft 231, the manual valve 100 being moved by pin 232 of lever 230. The linkage from the steering column mounted lever of Figure 14 moves the shaft 231 which rocks the lever 230. The cam face 234 of lever 230 is serrated for station positioning by poppet 235.

The locking pawl 236 of Figures 11 and 12 is pivoted on a bolt 237 mounted in the casing 199 and swings to mesh its tooth 238 with the teeth 62 of ring gear 57 of Figure 2. The lower end 236' of the pawl 236 is shaped for intersection with blocker piston 240 which under pump supplied pressure overcomes a spring 241 and seats into a recess 242 on the inner face of the arm 236' of the pawl 236. Anchor piece 241' retains the outer end of spring 241.

The arm 236 is formed into a channel 243 in which fits a roller 244 mounted on a crank pin 245 of shaft 246 of the stop mechanism.

The pawl actuation shaft 246 is supported in a bracket fitting 247 and its other end is fixed to a spring stop piece 248.

Mounted about the shaft 246 is a cam lever 251 having external spring pin 252, and affording an anchor point for one end of latch spring 253, the other end of which hooks over an axial extension of the stop piece 248, as shown in Figure 11. Spring 253 is pre-loaded to cause members 248 and 251 to rotate together, about shaft 246.

When the stop piece 248 and the cam lever 251 are not loaded by any external force, they rotate together about shaft 246 within the limits of motion permitted by the structure. The bracket 247 has a flat 254 which intersects the roller 244 of the crank pin 245 so as to limit the rotation of shaft 246 in one direction, and also stop piece 248. Force applied to rock the cam lever 251 may then wind up the spring 253.

The flat 254 is so related to the permitted angle of motion of the pawl 236 that the crank pin 245 cannot go past center in the direction of braking to the right in Figure 12, otherwise it would tend to lock past center and require re-seating of the pawl tooth 238 before it could be disengaged.

The other blocker piston 255 acts as a safety brake inhibitor means, and is moved by the pressure in governor line 256 against spring 257. The spring 257 is retained by a pin 258 anchored in the bracket 247, and the piston 255 is slotted to accommodate the pin 258, while having its skirt section emerge from the bracket 247 to strike the adjacent face of the cam lever 251 and seat in a recess 261 in the cam lever 251.

A separate tension return spring 262 is pinned at one end in the casing to act on pin 252 and the angle of pull is taken so that the movable end fastened to the pin 252, can aid in holding the cam lever 251 in "park" or "reverse" position. When the cam lever 251 is moved to other than "reverse" or "park" the pin 252 has rocked past center with respect to the shaft 246, and the spring 262 now applies a pull on the stop lever 251 tending to retain it in released position.

The first blocker piston 240 mentioned, which stops the pawl 236 itself, is subject to fluid pressure derived from the pump delivery line 116, therefore, unless and until the vehicle is stopped to inhibit rear pump pressure and the engine is stopped to inhibit front pump pressure, the pawl 236 cannot move to engagement with teeth 62 and the safety brake cannot be set.

It should be noted that the crank pin-and-roller motion 245—244 closely approaches dead center at the flat 254 during the pawl engagement period, so that forces coming from the pawl 236 such as created by the rejection angle of teeth 62 and 238 cannot move the pawl out of engagement because of the mechanical advantage of the crank-pin and roller engagement. This is a safety feature of special utility in prevention of undesired brake release.

The hand control of shaft 231 can at any time rock the cam lever 251 and shaft 246 to release the pawl 236 positively, the friction forces to be overcome being negligible, which motion is assisted by spring 262.

The turned lower edge 268 of lever 230 provides a range of intersection with the edge 263 of cam lever 251 such that in initial moving from brake engagement to disengagement a mechanical advantage is obtained by the fact that the radial center point of this sliding contact is shorter from the axis of the shaft 231 than when moving toward engagement. During the release period this effective contact arm lengthens. If the car engine stalls with the transmission in reverse, the brake pawl 236 engages automatically, since the mechanism is cocked, and spring 253 pre-loaded ready to act when car speed falls and pump pressure dies.

With this preferred form of control, it is best to "park" from "drive" or "low" control position of the controller since the rear unit servo has an accumulator action, which causes a time delay in the draining of the pump line system.

The ignition should be shut off in either "D" or "L," also, so as to stop the rotation of the front pump P, for in these control positions the rear unit servo has no pressure.

The cross shaft 231 is keyed to manual control lever 230, and its pin 232 as noted, intersects the motion of the manual valve 100. The lever 230 is formed at its lower portion into a fork having a short leg 267 and a long leg 268. In other than "P" or "R" positions, the lever 230 swings clockwise away from the cam lever 251. When lever 230 is moved to "R" the short leg 267 passes over the cam surface 263, and the long leg 268 picks up the cam lever 251, rocking same to stress the lost-motion spring 253, if at a time, the blocker piston 255 be loaded by governor pressure from line 256. If there is no governor pressure, the spring 257 is holding piston 255 out of interference with the cam lever 251, therefore the shaft 246 can rotate and the roller 244 and crank pin 245 can move the brake pawl 236 to engage teeth 62.

This is unusual in that the safety brake may be applied when the shift is actually in "reverse" setting, provided the vehicle is at zero or very low speed, and provided some other control is ineffective to block the pawl shift action.

The principal feature of particular novelty is the use of fluid-pressure-operated latches such as pistons and to inhibit or block the brake pawl 236, with control forces derived from vehicle speed governor and from the servo pumps which indicate rotation of either engine or tailshaft.

It should be noted that the servo energization of the reverse cone 130 tends to bring this member to rest, as a kind of zero-speed synchronizer, prior to the release of the pawl blocker pistons 240 and 257.

The tying together of the control for the transmission manual valve 100 and the safety brake pawl mechanism is a feature of particular utility, in that the operator has less individual selection of control operations under difficult operating conditions.

The governor device of Figure 13 is driven from gear 53 of carrier drum 52' at load shaft speed, as shown in Figure 13. The two valves 174 and 175 are alike, except for the masses of the calibrating weights, and operate as described in Letters Patent to Earl A. Thompson, U. S. 2,204,872, issued June 18, 1940, and shown in Figure 5 of that patent.

Cross-shaft gear 73 is driven by gear 53 fixed to shaft 72 to which is pinned the rotating governor body 74 carrying the valves 174, 175. The body has pump feed passage 116 open to input ports 75 and 76, and two delivery passages 178 and 179, one from each of the valves, connected at ports 177 and 78, and the outer radial ports 79 and 80 vent the excess of the speed metering action. With increase of speed of shafts 50 and 72, the valves 174, 175 move radially outward under their individual centrifugal force pattern, so as to supply separate fluid pressure rise resultants to the shifter valve control spaces 202, 210 and 209 below the plugs 203, 211, and 221 of Figure 5. Each governor valve provides a separate speed rise effect which is utilized to raise the shifter valves 143, 144, 145 of Figure 5 against the forces opposing the governor upshift action. The larger, inner radial bosses of the valves 174, 175 act as differential area elements being subject to the delivered pressure of lines 178, 179 which pressure opposes the centrifugal force of the valves, in order to meter the delivered control pressure in the desired manner. This pressure is used to apply force to the plugs 203, 211 and 221 to move the shifter valves 143, 144 and 145 for upshift, and also to load the safety brake piston 257 of Figure 11.

The pump Q is also driven from shaft 72 of Figure 13, its drive gear 86 keyed to shaft 72, meshing with idler gear 87, and supplying passage 81 of Figure 5 leading to check valves 111 open to main delivery line 115. When vehicle speed rises sufficiently for pump Q pressure to open check valve 111, the extra capacity of pump Q is added to that of the front pump P. During reverse drive, the reverse rotation of pump Q cannot starve the servo line, since check valve 111 prevents such action.

Figures 15 and 16 illustrate a variable displacement pump which may be substituted for the gear pump of Figures 5 and 6. The pump is of the variable stroke type having a sliding ring guide member which may be variably positioned, to vary the pump displacement, the position of the guide member being determined by means of differential balancing pressures derived from the action of a pressure regulating valve which may be moved to one position wherein the valve directs fluid pressure to shift the guide member to a full stroke or maximum eccentric position and may be moved to another position wherein the valve delivers pressure tending to shift the guide member to a decreased stroke position. The pressure regulating valve is positioned to be responsive to pump outlet pressure and may be over-controlled either by line pressure when the manual valve is placed for "reverse" as is the case of the gear pump of Figure 5, or by both the line pressure and the output of metering valve 350 when the manual valve 100 is placed in reverse or the output of valve 350 alone when the manual valve is in any position other than reverse, as is the case of the gear pump of Figure 6. While the pressure level of the system varies in the embodiments of Figures 5 and 6, the stroke and capacity of the pump of Figures 5 and 6 does not vary. The variable capacity pump of Figures 15 and 16 is advantageous in that it provides for more prompt response to changes in demand for fluid pressure, is better able to maintain constant operating pressure levels in the control system regardless of a wide range of speed of rotation of the pump, is quiet in operation, and reduces the power consumed in supplying fluid pressure.

Referring to Figures 15 and 16, the pump includes a casing 410 having a recess formed to receive a sliding guide member or modulator ring 411, the guide member dividing the recess into spaced chambers 412 and 413 at opposite sides of the guide member and disposed between the guide member and casing. The radial position of the guide member or modulator ring 411 in the pump casing is determined by the fluid pressure existing in chambers 412 and 413. A pump rotor 414, which carries a plurality of slidably mounted pump vanes 415, is positioned for rotary motion within a circular recess 416 formed in modulator ring 411. Shaft 417, keyed to rotor 414 may be driven by the vehicle engine to rotate the vanes in recess 416.

A pressure regulator valve 420, responsive to pump output pressure, functions to regulate the pump capacity by directing fluid pressure to control chambers 412 and 413 to vary the eccentricity of modulator ring 411 with respect to the pump vanes. Valve 420 is positioned in a radially positioned bore 421 communicating with an outlet pressure passage 422 for directing pump pressure to line 196. The valve body is formed with an axial bore 423, which in turn communicates with transverse bores 424 and 425, which latter bores provide fluid pressure communication to passages 426 and 427, depending upon the position of valve 420 in bore 421, a pair of fluid pressure exhaust ports 428 and 429 are formed in the pump casing, these ports leading to the sump and being adapted to connect passages 426 and 427 to exhaust by means of recesses 430 and 431 formed on the outer surface of the valve body. Passage 426 communicates with control chamber 412, while passage 427 communicates with control chamber 413.

A spring 432 is positioned between a stop member 433 formed on the valve body and a thumb screw 434 adapted to be screwed into the transmission housing 435 and acts to pre-load valve body 420 so that, in the absence of fluid pressure, bore 423 of the valve communicates with passage 427, while passage 426 is connected to exhaust passage 429. Spring 432 may be calibrated by adjusting thumb screw 434. The thumb screw is drilled to form a cylinder 436 in which is disposed a piston 437 having a stud 438 adapted to contact the head 439 of valve body 420 when fluid pressure is admitted to cylinder 436. A passage 440 provides communication between cylinder 436 and passage 125 of Figure 5. Line pressure is admitted to passage 125 whenever manual valve 100 of Figure 5 is placed in reverse.

In operation, line 125 is exhausted whenever the manual valve 100 is moved to any position other than reverse. Spring 432 initially biases valve 420 so that passage 426 is connected to exhaust port 429 by means of external recess 431. Control chamber 412 is therefore connected to exhaust. Internal passage 423 of the valve body is initially connected to passage 427 through port 425 so that fluid pressure developed by the pump is directed to control chamber 413, thereby urging modulator ring 411 to its maximum eccentricity for maximum pump capacity. As the pressure in line 196 builds up, this pressure reacts upon the valve body, forcing the spring 432 to be compressed until a balance is achieved between spring forces acting upon one side of the valve and fluid pressure force acting upon the other side of the valve. As the pressure builds up, passages 426 and 427 may be blocked by the valve, and upon further pressure rise, pump output pressure is directed to chamber 412, while chamber 413 is connected to exhaust. Such action causes modulator ring 411 to move toward its concentric position with respect to the pump vanes, thereby reducing pump output. In the event that the system requirements are fully met, the modulator ring may move to a position concentric with the pump vanes, thereby reducing the pump output to zero even though the pump vanes may be rotating at high speed.

When manual valve 100 is placed in its "reverse" position, fluid pressure admitted to cylinder 436 forces piston 437 against the head of the valve body, thereby assisting spring 432, so that higher pump output pressure is required to move the valve to reduce the pump capacity. In this manner, a higher line pressure is provided in "reverse" than when the manual valve is positioned for "drive" or "low range" condition of operation.

In the pump embodiment in Figure 16, the pump functions in the same manner as that of Figure 15, except that an additional control is added whereby the capacity of the pump is increased as the vehicle throttle is moved from a throttle closing to a throttle opening position. To achieve this result, a second piston 441 is positioned in cylinder 442, this piston acting to assist spring 432 when fluid pressure is admitted to chamber 442 through line 367' and passage 443. The effect of fluid pressure in chamber 442 is to require a higher pump line pressure for movement of valve body 420, thereby delaying the reduction of pump capacity until sufficient pressure is developed in line 196 to overcome the spring 432. Line 367' is fed by the metering valve 350 of Figure 6. In this manner, the pump capacity increases as the vehicle accelerator pedal moves the vehicle throttle from a throttle closing to a throttle opening position. This variation in pump capacity in accordance with the position of the vehicle engine throttle contributes to smoother actuation and application of the transmission bands and clutches and still permits undesirable slippage of these members irrespective of the torque transfer requirements imposed.

The preceding description recites the objects, advantages and useful results of the invention, and there has been embodied therein a number of features in combination, which are subject to changes in specific arrangement and forms of structures without departing from the spirit and scope of the invention, as set forth in the appended claims.

What is claimed is:

1. In a control system for a transmission having fluid pressure responsive servo members for determining the drive condition of the transmission, a fluid pressure source, means for selectively directing fluid pressure from said source to a pair of said servo members for selecting a drive condition of said transmission, means for delaying the application of one of said servo members until another of said servo members is first engaged when said selecting means is positioned for one transmission drive condition, and cam means disabling said delay means when said selecting means is positioned for another transmission drive condition of operation.

2. In a control system for a vehicle transmission having fluid pressure responsive servo members for determining the drive condition of the transmission, a fluid pressure source, a driver operable control valve movable to one position to select one condition of operation, an additional valve effective when said manual valve is in said one position to delay actuation of one of said servo members until another of said servo members is first actuated, and cam means effective when said control valve is moved to another position to disable the delay action of said additional valve.

3. In a control system for a vehicle transmission having fluid pressure responsive servo members for determining the drive condition of the transmission, a fluid pressure source, a driver operable control valve movable to select different conditions of transmission operation, additional valve means responsive to pressure directed to one of said servo members for delaying the actuation of another of said servo members until said first mentioned servo member is actuated, and cam means for disabling said delay valve means when said control valve is moved to select a different condition of transmission operation.

4. In a control system for a vehicle transmission having fluid pressure responsive drive units for determining the drive condition of said transmission, a fluid pressure source, a driver operable control valve movable to select different conditions of transmission operation, one of said drive units including a planet carrier splined to an output shaft, a sun gear, a drum member having an annulus gear thereon, planet gears supported upon said carrier in mesh with said sun and annulus gears, a conical extension on said drum, a conical backing member, piston means for forcing said extension against said backing member to brake said drum when said manual valve is positioned for one condition of transmission operation, said sun, planet and annulus gears being cut on a helix angle such that said drum receives a thrust effective to assist said piston in braking said drum when said manual valve is positioned to direct fluid pressure from said source to said piston, and additional valve means for delaying the actuation of another of said drive units until said one drive unit is first actuated when said manual valve is positioned to direct fluid pressure to said piston, said valve including a casing having a port connected to said one servo, a port connected to said fluid pressure source, a port connected to said other servo, and an exhaust port, a valve member slidable in said casing, means yieldably biasing said valve member to connect said other servo to exhaust, said valve member being responsive to pressure build up in said one servo to block off said exhaust port and to connect said other servo to said fluid pressure source.

5. In a control system for a vehicle transmission having fluid pressure responsive drive units for determining the drive condition of said transmission, a fluid pressure source, a driver operable control valve movable to select different conditions of transmission operation, one of said drive units including a planet carrier splined to an output shaft, a sun gear, a drum member having an annulus gear thereon, planet gears supported upon said carrier in mesh with said sun and annulus gears, a conical extension on said drum, a conical backing member, piston means for forcing said extension against said backing member to brake said drum when said manual valve is positioned for one condition of transmission operation, said sun, planet and annulus gears being cut on a helix angle such that said drum receives a thrust effective to assist said piston in braking said drum when said manual valve is positioned to direct fluid pressure from said source to said piston, additional valve means for delaying the actuation of another of said drive units until said one drive unit is first actuated when said manual valve is positioned to direct fluid pressure to said piston, and cam means effective when said control valve is moved to select another condition of operation to disable the delay action of said additional valve.

6. In a control system for a vehicle transmission having fluid pressure responsive drive units for determining the drive condition of the transmission, a fluid pressure source, a driver operable control valve movable to select different conditions of operation, a parking brake mechanism, means for pre-loading said parking brake mechanism for operation when said manual valve is moved to select one condition of transmission operation, and blocking means responsive to a predetermined fluid pressure in said control system for preventing operation of said parking brake mechanism.

7. In a control system for a vehicle transmission having fluid pressure responsive servo units for determining the drive condition of the transmission, an engine driven pump and a vehicle tail shaft driven pump for supplying fluid pressure to said system, a driver operable control valve movable to select different conditions of transmission operation, a parking brake mechanism, spring means for moving said parking brake mechanism for operation, means for pre-loading said spring to apply said parking brake mechanism when said manual valve is positioned to select one condition of transmission operation, and fluid pressure responsive means acting in opposition to said spring for blocking the operation of said parking brake mechanism when the pressure supplied by either of said pumps exceeds a predetermined amount.

8. In a control system for a vehicle transmission having fluid pressure responsive servo units for determining the drive condition of the transmission, a source of fluid pressure for said system, a driver operable control valve movable to select different conditions of transmission operation, a parking brake mechanism including a pawl movable to engage an element of one of said servo units, spring means for urging said pawl into engagement with said servo unit element, means for pre-loading said spring to urge said pawl toward engagement with said element when said manual valve is moved to select reverse condition of operation, and piston means connected to said fluid pressure source for preventing engagement of said pawl with said servo element when the system pressure exceeds a predetermined amount.

9. In a control system for a vehicle transmission having fluid pressure servo units for determining the drive condition of the transmission, a fluid pressure source, a driver operable control valve movable to direct fluid pressure from said source to a pair of said servo units for selection of one condition of transmission operation, a restricting check valve intermediate said manual valve and one of said servo units for regulating the rate of admission of pressure to and discharge of pressure from said one servo unit, and an additional valve for delaying the actuation of the other of said pair of units until said one servo unit is fully actuated.

10. In a control system for a vehicle transmission having fluid pressure servo units for determining the drive condition of the transmission, a fluid pressure source, a driver operable control valve movable to direct fluid pressure from said source to a pair of said servo units for selection of one condition of transmission operation, a restricting check valve intermediate said manual valve and one of said servo units for regulating the rate of admission of pressure to and discharge of pressure from said one servo unit, an additional valve for delaying the actuation of the other of said pair of units until said one servo unit is actuated, and means effective when said control valve is moved to a different position to disable the delay action of said additional valve.

11. In a control system for a vehicle transmission having fluid pressure responsive servo units for determining the drive condition of the transmission, a fluid pressure source, a driver operable control valve movable to direct fluid pressure from said source to a pair of said servo units for selection of one condition of transmission operation, a parking brake mechanism including a pawl movable to engage an element of one of said servo units, spring means for urging said pawl into engagement with said servo unit element, means for pre-loading said spring to urge said pawl toward engagement with said servo unit element when said manual valve is positioned to select said one condition of transmission operation, fluid pressure controlled blocking means connected to said pressure source for preventing operation of said parking brake mechanism, a restricting check valve intermediate said control valve and said one servo unit for regulating the rate of admission of pressure to and discharge of pressure from said one servo unit, and additional valve means for delaying actuation of the other of said servo units until said one servo unit is actuated, said blocker mechanism permitting engagement of said parking brake mechanism when the fluid pressure in said system falls below a predetermined pressure.

12. In a control system for a vehicle transmission having fluid pressure responsive servo units for determining the drive condition of the transmission, a fluid pressure source, a driver operable control valve movable to direct fluid pressure from said source to a pair of said servo units for selection of one condition of transmission operation, a parking brake mechanism including a pawl movable to engage an element of one of said servo units, spring means for urging said pawl into engagement with said servo unit element, means for pre-loading said spring when said control valve is positioned to select one condition of operation, fluid pressure controlled blocking means connected to said pressure source for preventing operation of said parking brake mechanism, a restricting check valve intermediate said control valve and said one servo unit for regulating the rate of admission of pressure to and rate of pressure discharge from said one servo unit, additional valve means responsive to system pressure for delaying actuation of the other of said servo units until said one servo unit is actuated, said blocker mechanism permitting engagement of said parking brake mechanism when the fluid pressure in said system falls below a predetermined pressure, and means for disabling the delay action of said additional valve when said control valve is moved to select a different condition of transmission operation.

13. In a torque transmitting structure including a fluid coupling mechanism for transferring torque to a step-ratio transmission mechanism, a drum forming a chamber enclosing said fluid coupling mechanism, a sump for working fluid, a pump supplying fluid under pressure to said chamber, said fluid coupling mechanism acting on said working fluid to heat the same in said chamber, a pressure regulating valve responsive to fluid pressure in said chamber for regulating the fluid pressure in said chamber, a passage leading from said pressure regulating valve to transfer heated working fluid from said chamber to said step-ratio transmission mechanism for lubricating the latter, said valve permitting substantially continuous flow of working fluid from said pump back to said sump, said drum and sump providing heat radiating surfaces for cooling the circulating body of working fluid.

14. In a torque transmitting structure including a fluid coupling mechanism for transferring torque to a step-ratio transmission mechanism, a drum forming a chamber enclosing said fluid coupling mechanism, a sump for working fluid, a pump for supplying fluid under pressure to said chamber, said fluid coupling mechanism acting upon said working fluid to heat the same as it is circulated in said chamber, a pair of concentric shafts associated with said fluid coupling mechanism and said step-ratio transmission mechanism, a passage intermediate said shafts for transferring working fluid from said chamber to said step-ratio transmission mechanism for providing lubrication of the latter, a valve having a lip portion adapted to contact one end of one of said shafts for restricting flow of pressure fluid from said chamber to said passage, spring means urging said valve to contact shaft end, said valve presenting a differential area to working fluid in said chamber effective to cause said working fluid to move said valve against said spring, said valve permitting substantially continuous flow of working fluid from said pump to said sump, and said drum and said sump presenting heat radiating surfaces for cooling said circulating working fluid.

15. In a control system for a transmission having fluid pressure responsive servo members for determining the drive condition of the transmission, a fluid pressure source, a manually movable valve for selectively directing fluid pressure from said source to a pair of said servo members for selecting a drive condition of said transmission, a timing valve for delaying the application of one of said servo members until another of said servo members is fully applied when said transmission drive condition is selected by said manual valve, and cam means carried by said manual valve for disabling said timing valve when said manual valve is moved to select a different condition of transmission operation.

16. In a control system for a transmission having fluid pressure responsive servo members for determining the drive condition of the transmission, a fluid pressure source, valve means for selectively directing pressure from said source to a pair of servo members for selecting a drive condition of operation, additional valve means for delaying the application of one of said servo members until a second of said servo members is first applied, means yieldably biasing said additional valve to connect said one servo member to exhaust and to block fluid pressure supply to said one servo member, said additional valve being responsive to pressure supplied to said second servo member and movable under the influence of such pressure against said biasing means to block the exhaust of fluid pressure from said one servo member and to connect said one servo member to said fluid pressure source.

17. In a control system for a vehicle transmission having fluid pressure responsive servo members for determining the drive condition of the transmission, a fluid pressure source, a driver operable control valve for selectively directing pressure from said source to said servo members for selecting the drive condition of the transmission, an additional valve responsive to pressure applied to one of said servo members for delaying the application of another of said servo members when said control valve is positioned for a predetermined condition of transmission operation, and mechanical means operated by said control valve for disabling said additional valve when said control valve is moved to establish a second condition of transmission operation.

18. In a control system for a transmission having fluid pressure responsive servo members for determining the drive condition of the transmission, a fluid pressure source, a manually operable control valve for selectively directing pressure from said source to a pair of said servo members to select a drive condition of operation, a timing valve effective when said manual valve is positioned to select reverse operation to delay the application of one servo member until the other servo member is first applied, and cam means carried by said manual valve for disabling the timing action of said timing valve when said manual valve is moved from its reverse position.

19. In a control system for a transmission having fluid pressure responsive servo members for determining the drive condition of the transmission, a fluid pressure source, means for selectively directing fluid pressure from said source to first and second of said servo members for selecting a drive condition of said transmission, and a timing valve for delaying the application of the second of said servo members until the first of said servo members is fully applied when said drive condition is selected, said timing valve having a valve body, a bore in said valve body, a valve member slidably disposed in said bore, said valve body having an exhaust port, a pressure delivery port connected to said second servo, a pressure supply port, and an additional port connected to said first servo, means yieldably biasing said valve member to connect said second servo to said exhaust port, and means responsive to fluid pressure delivered to said first servo for moving said valve member to block said exhaust port and connect said second servo to said fluid pressure source.

20. In a control system for a vehicle transmission having an engine driven shaft and an output shaft, an engine driven pump, an output shaft driven pump, fluid pressure responsive servo members for determining the drive condition of the transmission, a driver operable control valve movable to select different conditions of operation, a parking brake mechanism, means for pre-loading said parking brake mechanism for operation when said manual valve is moved to select one condition of transmission operation, and blocking means responsive to pressure supplied by either of said pumps for preventing operation of said parking brake mechanism.

21. In a control system for a vehicle transmission having fluid pressure responsive servo units for determining the drive condition of said transmission, an engine driven pump and a transmission output shaft driven pump for supplying pressure to the transmission control system, a parking brake pawl movable to engage one element of one of the servo units, a manually operable valve movable to select different conditions of transmission operation, a selector handle, a linkage from said handle to said parking brake pawl for pre-loading said pawl when said handle is moved to position said manual valve for reverse operation, and a blocking piston responsive to pressure delivered by either said engine driven pump or said output shaft driven pump for preventing operation of said parking brake pawl.

22. In a control system for a vehicle transmission having fluid pressure servo units for determining the drive condition of the transmission, a fluid pressure source, a driver operable control valve movable to one position to direct pressure from said source to a pair of said servo units to select one condition of operation, and a restricting check valve intermediate said driver operable control valve and one of said servo units, said check valve including a plate member overlapping the path of travel of fluid pressure to said one servo, an orifice in said plate member, said plate member being movable responsive to fluid pressure directed to said servo to permit a relatively rapid rate of admission of fluid pressure to said servo, said plate member being effective upon discharge of pressure from said servo to block the path of travel of fluid being discharged from said servo and to cause said fluid to discharge through said orifice.

23. In a control system for a vehicle transmission having fluid pressure responsive servo units for determining the drive condition of the transmission, a fluid pressure source, a manually operable valve movable to direct pressure from said source to a pair of said servo units, and a restricting check valve intermediate said manual valve and one of said servo units, said restricting check valve including a plate member yieldably biased to overlap the path of travel of fluid pressure to said one servo, said plate member being responsive to fluid pressure directed to said servo to permit a relatively rapid rate of admission of pressure to said servo, an orifice in said plate member, said plate member being effective upon discharge of pressure from said servo to block the path of travel of fluid pressure discharging from said servo and to cause said fluid to discharge through said orifice.

References Cited in the file of this patent

UNITED STATES PATENTS

| | | |
|---|---|---|
| Re. 22,967 | Nutt et al. | Jan. 27, 1948 |
| 1,588,602 | Midgley | June 15, 1926 |
| 1,979,488 | Perez | Nov. 6, 1934 |
| 2,064,421 | Erskine | Dec. 15, 1936 |
| 2,085,668 | Mueller | June 29, 1937 |
| 2,204,872 | Thompson | June 18, 1940 |
| 2,205,470 | Dunn et al. | June 25, 1940 |
| 2,221,393 | Carnegie | Nov. 12, 1940 |
| 2,246,673 | Glasner | June 24, 1941 |
| 2,259,437 | Dean | Oct. 21, 1941 |
| 2,291,424 | Wichorek | July 28, 1942 |
| 2,516,203 | Greenlee | July 25, 1950 |
| 2,516,208 | Hasbany | July 25, 1950 |
| 2,528,584 | Farkas | Nov. 7, 1950 |
| 2,541,391 | Weiss et al. | Feb. 13, 1951 |
| 2,559,128 | McFarland | July 3, 1951 |
| 2,564,466 | Clifton | Aug. 14, 1951 |
| 2,603,235 | Kirkham | July 15, 1952 |
| 2,654,269 | Wilson | Oct. 6, 1953 |
| 2,675,102 | Robinson | Apr. 13, 1954 |

FOREIGN PATENTS

| | | |
|---|---|---|
| 10,486 1904 | Great Britain | Apr. 20, 1905 |

OTHER REFERENCES

Publication Product Engineering, pp. 94–97, vol. 21, No. 1, January 1950.